(12) United States Patent
McNichols et al.

(10) Patent No.: US 11,961,289 B2
(45) Date of Patent: Apr. 16, 2024

(54) COMPUTER VISION-BASED YIELD-TO-PICKING AREA MAPPING FOR HORTICULTURAL PRODUCT

(71) Applicant: Climate LLC, Saint Louis, MO (US)

(72) Inventors: John M. McNichols, Ballwin, MO (US); Daniel A. Williams, Sacramento, CA (US); Keely Roth, San Francisco, CA (US); Ali Hamidisepehr, San Francisco, CA (US)

(73) Assignee: CLIMATE LLC, Saint Louis, MO (US)

( * ) Notice: Subject to any disclaimer, the term of this patent is extended or adjusted under 35 U.S.C. 154(b) by 371 days.

(21) Appl. No.: 17/377,275

(22) Filed: Jul. 15, 2021

(65) Prior Publication Data

US 2022/0019796 A1 Jan. 20, 2022

Related U.S. Application Data

(60) Provisional application No. 63/052,942, filed on Jul. 16, 2020.

(51) Int. Cl.
*G06N 20/00* (2019.01)
*G06Q 10/0631* (2023.01)
(Continued)

(52) U.S. Cl.
CPC ............ *G06V 20/188* (2022.01); *G06N 20/00* (2019.01); *G06Q 10/06316* (2013.01); *G06V 20/41* (2022.01)

(58) Field of Classification Search
CPC ...... G06V 20/188; G06V 20/41; G06V 10/82; G06V 20/10; G06N 20/00; G06N 3/045;
(Continued)

(56) References Cited

U.S. PATENT DOCUMENTS 5,480,354 A 1/1996 Sadjadi
2011/0072773 A1 3/2011 Schroeder
(Continued)

OTHER PUBLICATIONS

Jacques et al., "Development of a Machine Vision Yield Monitor for Shallot Onion Harvesters", Proceedings of the 14th Intl. Conf. on Precision Agriculture, Jun. 27, 2018, 13pgs.
(Continued)

*Primary Examiner* — Stephen P Coleman
(74) *Attorney, Agent, or Firm* — Harness, Dickey & Pierce, P.L.C.

(57) ABSTRACT

Embodiments of the disclosed technologies are capable of inputting, to a machine-learned model that has been trained to recognize a horticultural product in digital imagery, digital video data comprising frames that represent a view of the horticultural product in belt-assisted transit from a picking area of a field to a harvester bin; outputting, by the machine-learned model, annotated video data; using the annotated video data, computing quantitative data comprising particular counts of the individual instances of the horticultural product associated with particular timestamp data; using the timestamp data, mapping the quantitative data to geographic location data to produce a digital yield map; causing display of the digital yield map on a field manager computing device.

19 Claims, 18 Drawing Sheets

(51) Int. Cl.
*G06V 20/10* (2022.01)
*G06V 20/40* (2022.01)

(58) Field of Classification Search
CPC .............. G06N 3/084; G06Q 10/06316; A01B 79/005; A01D 41/1271
USPC ........................................................ 382/110
See application file for complete search history.

(56) References Cited

U.S. PATENT DOCUMENTS

| | | |
|---|---|---|
| 2018/0042176 A1* | 2/2018 | Obropta .................... G06T 7/55 |
| 2018/0047177 A1 | 2/2018 | Obropta et al. |
| 2018/0164471 A1 | 6/2018 | Dybro et al. |
| 2019/0050948 A1 | 2/2019 | Perry et al. |
| 2020/0033274 A1 | 1/2020 | Couture et al. |

OTHER PUBLICATIONS

International Searching Authority, "Search Report", in Application No. PCT/US2021/041770. dated Oct. 20, 2021, 19 pages.

\* cited by examiner

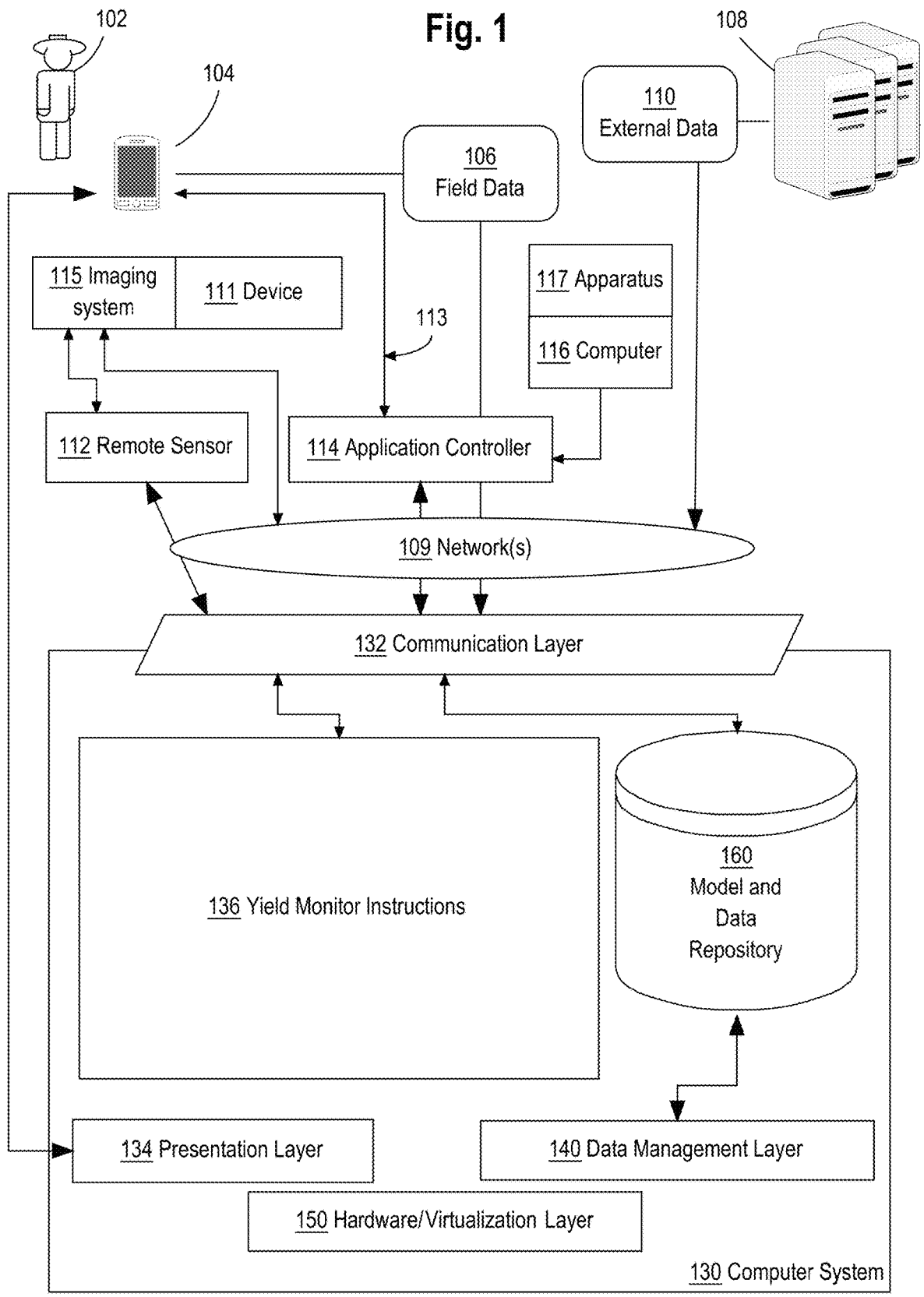

Fig. 2C

Data Manager

| Nitrogen | Planting | Practices | Soil |

| Planting 1(4 Fields) | Planting 2(0 Fields) | Planting 3(0 Fields) | Planting 4(1 Fields) | Add New Planting Plan |
| Crop Corn Product | Crop Corn Product | Crop Corn Product | Crop Corn Product | |
| Plant Date: 2016-04-12 | Plant Date: 2016-04-15 | Plant Date: 2016-04-13 | Plant Date: 2016-04-13 | |
| ILU 112 \| Pop: 34000 | ILU 83 \| Pop: 34000 | ILU 83 \| Pop: 34000 | ILU 112 \| Pop: 34000 | |
| [Edit] [Apply] | [Edit] [Apply] | [Edit] [Apply] | [Edit] [Apply] | |

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | [160] | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

Fig. 2D

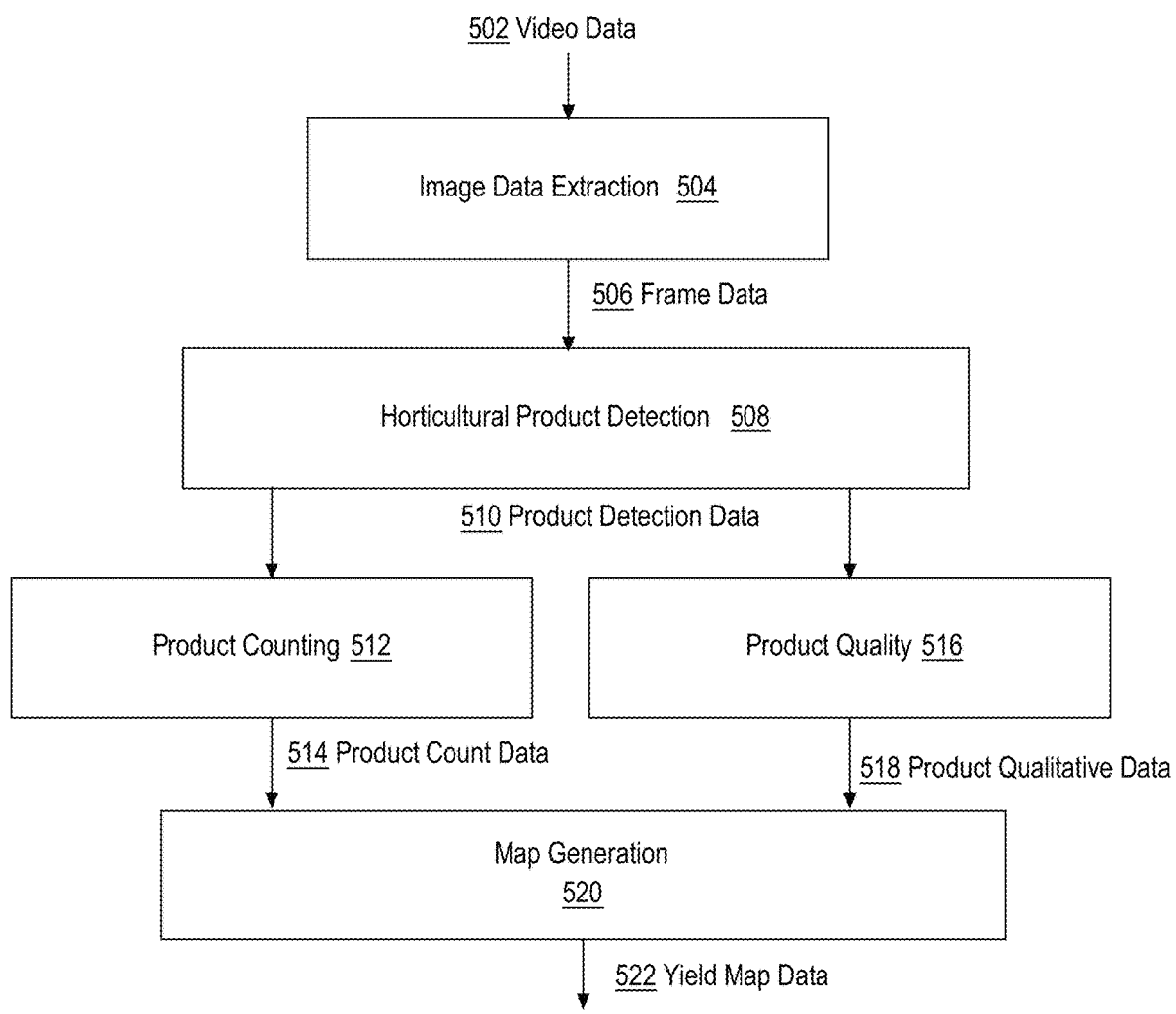

COMPUTER VISION-BASED YIELD-TO-PICKING AREA MAPPING FOR HORTICULTURAL PRODUCT

BENEFIT CLAIM

The present application claims the benefit under 35 U.S.C. § 119 of Provisional Application No. 63/052,942 filed Jul. 16, 2020, the entire contents of which are incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2021 The Climate Corporation.

FIELD OF THE DISCLOSURE

The present disclosure relates to horticultural intelligence systems, and more particularly to technologies for mapping yield to picking area for horticultural products.

BACKGROUND

For horticultural crops, it is difficult for computers to correlate yield to a particular picking area where a horticultural product is picked within a field. This is due to limitations of existing horticultural yield monitoring and harvesting technology, as well as typical physical characteristics of the horticultural crops. For many horticultural products, a non-destructive harvest is achieved using a belt-assisted harvester.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of the disclosure.

BRIEF DESCRIPTION OF THE DRAWINGS

In the drawings:

FIG. 1 illustrates an example computer system that is configured to perform the functions described herein, with portions shown in a field environment including other apparatus with which the system may interoperate.

FIG. 2C depicts an example embodiment of a timeline view for data entry.

FIG. 2D depicts an example embodiment of a spreadsheet view for data entry.

FIG. 5A illustrates a flow of a programmed process by which the example computer system generates yield map data, which can be used by other apparatus with which the system may interoperate.

DETAILED DESCRIPTION

Figure 2A:
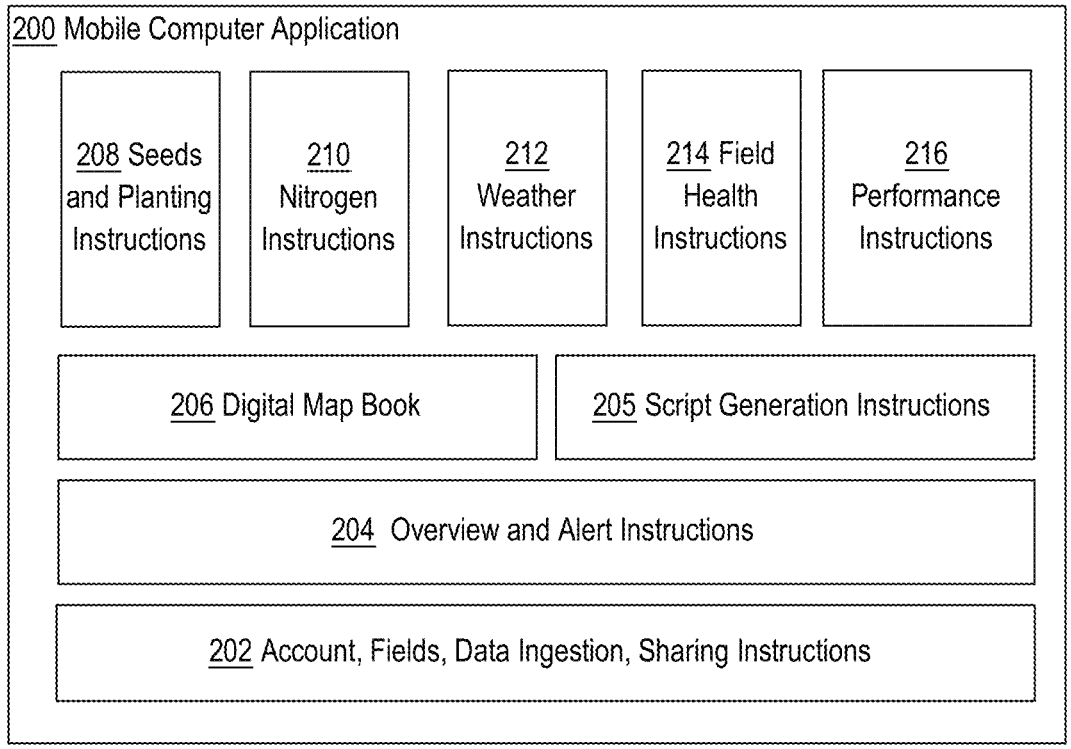
FIG. 2A and FIG. 2B illustrate two views of an example logical organization of sets of instructions in main memory when an example software application is loaded for execution.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE COMPUTER SYSTEM
   2.1. STRUCTURAL OVERVIEW
   2.2. APPLICATION PROGRAM OVERVIEW
   2.3. HARDWARE OVERVIEW
3. EXAMPLE—COMPUTER VISION-BASED MODEL
4. EXAMPLE—YIELD MONITORING PROCESS
   4.1. PROCESS OVERVIEW
   4.2. HORTICULTURAL PRODUCT DETECTION EXAMPLES
   4.3. YIELD TO PICKING AREA MAPPING PROCESS
   4.4. YIELD MAP EXAMPLES
5. ADDITIONAL EXAMPLES
6. BENEFITS, EXTENSIONS AND ALTERNATIVES

1. GENERAL OVERVIEW

This disclosure describes technologies that enable yield information to be determined from video of horticultural products. Using the disclosed technologies, yield can be monitored and mapped to particular picking areas within a field at harvest time.

Embodiments of the disclosed technologies utilize video imagery that contains instances of horticultural product. In an embodiment, in an harvesting apparatus, an image sensor has been arranged to capture digital imagery of instances of a horticultural product after the product has been picked from the field and placed in transit from the picking area via one or more conveyor belts to a harvester bin that is coupled to a vehicle that can haul the products in the harvester bin away. Instances of the horticultural product are transported from the picking area to the harvester bin via belt-assisted technology. For example, instances of the horticultural product may be picked and transferred to a conveyor belt, which transports the product to the harvester bin.

The video imagery captured during the picking area-to-bin transport of the horticultural product is input into a machine-learned model that has been trained to recognize instances of the horticultural product in video imagery. The machine-learned model outputs digital annotation data, digital geographic location data, and digital timestamp data. The digital annotation data is indicative of individual instances of the horticultural product detected in frames of the video imagery by the machine-learned model. The digital geographic location data corresponds to data that has been obtained via a sensor that sensed geographic locations at which the video imagery was captured. The digital timestamp data is indicative of timestamps associated with frames of the video imagery.

The annotated video data is used to compute quantitative data and/or qualitative data about the individual instances of the horticultural product detected in the video imagery. For example, embodiments count the number of individual instances of horticultural product detected in the video imagery. Alternatively or in addition, embodiments use the annotated video data to calculate the sizes of, and/or determine one or more other characteristics of individual instances of horticultural product detected in the video imagery, as described in more detail below.

A digital yield map can be output in a form of electronic communication that is capable of being used by a device to control an agricultural operation. For example, yield map data produced by the disclosed technologies may be used to determine or modify a route that a harvester or other implement uses to traverse a field, or cause the machine to follow a route that has been determined using the disclosed technologies. In an embodiment, yield map data includes location points, such as longitude and latitude coordinates, centroid points, etc. which are used to generate navigation instructions of a ground vehicle moving through the field, such as a harvester, a sprayer or a fertilizer applicator, or an aerial vehicle flying above the field, such as a drone. For instance, yield map location points that represent regions of particularly low yield or particularly high yield may be transformed into waypoints of a route for a vehicle.

The vehicle route as determined or modified by the yield data produced by the disclosed technologies is transmitted to a vehicle computer, such as a cab computer of a tractor pulling an implement or an embedded controller that controls operations of the implement, and the vehicle computer operates the implement along the route that has been determined or modified by the yield data produced by the disclosed technologies.

In another embodiment, location points extracted from yield map data produced by the disclosed technologies, such as centroid points of data representing regions of high yield, are transformed into a route to be traversed by trucks or bins to receive harvested products so that adequate bin or truck capacity is available at high-yield positions. In still another embodiment, location points extracted from yield map data produced by the disclosed technologies, such as centroid points of data representing regions of very low yield or no yield, are excluded from a route to be traversed by trucks or bins, in order to improve efficiency of the operation by causing the vehicle to avoid very low yield and no yield positions.

In these and other examples, the yield map data produced by the disclosed technologies is used to determine or modify one or more operating parameters of the harvester or other implement. Examples of operating parameters include speed, direction, date/time of operation, number, type, or configuration of bins; number, type, or configuration of conveyor belts. Location points extracted from yield map data produced by the disclosed technologies may, alternatively or in addition, be used to control the speed at which a vehicle traverses the route. Vehicle speed may be increased through location points of very low or no yield, and the vehicle speed may be decreased through locations of high yield.

For example, the centroids of data associated with high-yield locations may be used in a speed control program to instruct a harvester, tractor or other machine to reduce speed when high-yield locations are reached to ensure adequate capture of products during harvesting.

In some embodiments, yield map data produced by the disclosed technologies is used to define management zones and/or to determine a prescription for application of nutrients or fertilizer to a field. Examples of uses of yield data to produce management zones and fertilizer application rates are described in U.S. Pat. Nos. 10,398,096; 10,667,474; and US20160180473, each of which is incorporated herein by this reference.

Field as used herein may refer to a bounded tract of land, which may be defined by a set of acres. Field location as used herein may refer to a particular location or sub-area of a field. Picking area as used herein may refer to a field location or more specifically, a field location in which at least one instance of horticultural product was harvested. Product as used herein may refer to a horticultural product, such as a fruit or vegetable. Horticultural operation, as used herein, may refer to operations conducted on one or multiple fields, which may or may not be contiguous, in which horticultural products may be planted or harvested.

2. EXAMPLE COMPUTER SYSTEM

2.1 Structural Overview

FIG. 1 illustrates an example computer system that is configured to perform the functions described herein, with a portion of the computer system shown in a field environment with other apparatus with which the system may interoperate. In one embodiment, a user 102 owns, operates, or possesses a computing device 104. The computing device 104 is programmed or configured to provide field data 106 and/or control signals to a computer system 130 and/or to receive field data 106 and/or control signals from computer system 130, via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle (UAV), planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases. In some embodiments, field data 106 includes imagery, such as still or video digital imagery. Field data 106 may include raw measured, detected, or sensed data values and/or data values that have been computed using raw data values, and may include estimates and predicted data values.

A data server computer 108 is communicatively coupled to computer system 130 and is programmed or configured to send external data 110 to computer system 130 via the network(s) 109. The data server computer 108 may be owned or operated by the same legal person or entity as the computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server computer 108 owned by the same entity that owns and/or operates the computer system 130. For example, the computer system 130 may include a data server focused exclusively on a type of data that might otherwise be obtained from third party sources, such as weather data. In some embodiments, an external data server computer 108 may be incorporated within the system 130.

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

A device 111 may have one or more remote sensors 112 fixed thereon or coupled thereto, which sensors are communicatively coupled either directly or indirectly via device 111 to the computer system 130 and are programmed or configured to send sensor data to computer system 130. Examples of device 111 include tractors, combines, harvesters, conveyor belts, planters, trucks, fertilizer equipment, aerial vehicles including unmanned aerial vehicles, and any other item of physical machinery or hardware, typically mobile machinery, and which may be used in tasks associated with horticultural operations. In some embodiments, a single unit of device 111 may comprise a plurality of sensors 112 that are coupled locally in a network on the apparatus; controller area network (CAN) is example of such a network that can be installed in combines, harvesters, sprayers, and cultivators. In some embodiments, remote sensors 112 may not be fixed to a device 111 but may be remotely located in the field and may communicate with network 109. Sensor data may include the same type of information as field data 106.

The device 111 may include an imaging system 115. The imaging system 115 may be programmed or configured to receive, process, and store imagery data (for example, video imagery captured by the sensor(s) 112, camera, computer, smartphone, tablet, unmanned aerial vehicle, planes, or satellite). A portion of imaging system 115 may be located on the device 111 and another portion of imaging system 115 may be located at another site. Data communication between the two portions may be provided by a telemetry system including a digital data link established by the site with the device 111. The digital data link and/or telemetry system may be programmed or configured for real-time data communication. In an embodiment, device 111 is a harvester apparatus that includes a conveyor belt and harvester bin, and imaging system 115 is programmed or configured to produce and store video imagery generated by at least one sensor 112. In an embodiment, the sensor(s) that produce the video imagery include or are in communication with a global positioning system (GPS) component, which automatically produces geographic location data and correlates the geographic location data with the video imagery.

In an embodiment, remote sensor 112 comprises one or more sensors that are programmed or configured to produce one or more observations. Remote sensor 112 may be a video camera, aerial sensors, such as satellites, vehicle sensors, planting equipment sensors, tillage sensors, fertilizer or insecticide application sensors, harvester sensors, and any other implement capable of capturing or receiving data from the one or more fields. In an embodiment, application controller 114 is programmed or configured to receive instructions from computer system 130. Application controller 114 may also be programmed or configured to control an operating parameter of an agricultural vehicle or implement. For example, an application controller 114 may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, yield monitor systems may contain yield sensors for harvester apparatus that send yield measurement data to the computer 116 or other devices within the system 130. Yield monitor systems may utilize one or more remote sensors 112 to obtain, for example, moisture measurements in a combine or other harvester and transmit these measurements to the user via the computer 116 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed on harvester equipment, such as a conveyor belt, in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage, and configure any of the foregoing sensors.

An apparatus 117 may include one or more tractors, combines, harvesters, planters, trucks, fertilizer equipment, aerial vehicles including unmanned aerial vehicles, and any other item of physical machinery or hardware, typically mobile machinery, and which may be used in tasks associated with horticulture and/or other farming operations. The apparatus 117 may comprise or be coupled to a computer 116 that is programmed with a software application, which may comprise a version or variant of the software application for device 104 that is further described in other sections herein. In an embodiment, computer 116 comprises a compact computer, often a tablet-sized computer or smartphone, with a graphical screen display, such as a color display, that is mounted within an operator's cab of the apparatus 117. Computer 116 may implement some or all of the operations and functions that are described further herein for the computing device 104.

Application controller 114 is communicatively coupled to computer system 130 via the network(s) 109 and is programmed or configured to receive one or more scripts that are used to control an operating parameter of a device, vehicle or implement, such as computing device 104, apparatus 117 or device 111, from the computer system 130. For instance, a controller area network (CAN) bus interface may be used to enable communications from the computer system 130 to the computer 116 via the network(s) 109. The network(s) 109 may be used to enable communications from the imaging system 115 to the computer system 130, from the computer system 130 to the imaging system 115, from the computer system 130 to the computing device 104, from the computing device 104 to the computer system 130.

The network(s) 109 broadly represent any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Computer system 130 is programmed or configured to receive field data 106 from computing device 104, external data 110 from external data server computer 108, sensor data from remote sensor 112, and/or imagery data from imaging system 115. Computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, computer system 130 is programmed with or comprises a communication layer 132, a presentation layer 134, a data management layer 140, a hardware/virtualization layer 150, and a model and field data repository 160. "Layer," in this context, refers to any combination of computer hardware and/or software, such as electronic digital interface circuits, microcontrollers, firmware such as drivers, and/or computer programs or other software elements.

Communication layer 132 may be programmed or configured to perform input/output interfacing functions including sending requests to computing device 104, computer 116, imaging system 115, external data server computer 108, and remote sensor 112 for field data, external data, and/or sensor data. Communication layer 132 may be programmed or configured to send the received data to model and field data repository 160 to be stored as field data 106.

Presentation layer 134 may be programmed or configured to generate a graphical user interface (GUI) to be displayed on computing device 104, computer 116 or other computers that are coupled to the system 130 through the network(s) 109. The GUI may comprise controls for inputting data to be sent to computer system 130, generating requests for models and/or recommendations, and/or displaying recommendations, notifications, models, and other field data.

Data management layer 140 may be programmed or configured to manage read operations and write operations involving the model and repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database; for example, a database in which model parameters and weights are stored. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGR- ESQL databases. However, any database may be used that enables the systems and methods described herein.

When field data 106 is not provided directly to the computer system 130 via a device 111, remote sensor 112, computing device 104, or computer 116, the user may be prompted via one or more user interfaces on the user device (served by the computer system 130) to input such information. In an example embodiment, the user may specify identification data by accessing a map on the user device (served by the computer system 130) and selecting specific common land units (CLUs) or contiguous farming parcels that have been graphically shown on the map. In an alternative embodiment, the user 102 may specify identification data by accessing a map on the user device (served by the computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the computer system 130.

In an example embodiment, the computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

In an embodiment, yield monitor instructions 136 comprises a set of one or more pages of main memory, such as RAM, in the computer system 130 into which executable instructions have been loaded and which when executed cause the computing system 130 to perform the functions or operations that are described herein with reference to those instructions. For example, yield monitor instructions 136 may comprise a set of pages in RAM that contain instructions which when executed cause performing the yield prediction functions that are described herein with reference to FIGS. 4 and 5. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, yield monitor instructions 136 also may represent one or more files or projects of source code that are digitally stored in a mass storage device such as non-volatile RAM or disk storage, in the computer system 130 or a separate repository system, which when compiled or interpreted cause generating executable instructions which when executed cause the agricultural intelligence computing system to perform the functions or operations that are described herein with reference to those modules. In other words, the drawing figures may represent the manner in which programmers or software developers organize and arrange source code for later compilation into an executable, or interpretation into bytecode or the equivalent, for execution by the computer system 130.

Hardware/virtualization layer 150 comprises one or more central processing units (CPUs), memory controllers, and other devices, components, or elements of a computer system such as volatile or non-volatile memory, non-volatile storage such as disPlk, and I/O devices or interfaces. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different computing devices 104 associated with different users. Further, the system 130 and/or external data server computer 108 may be implemented using two or more processors, cores, clusters, or instances of physical machines or virtual machines, configured in a discrete location, or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as instructions, plans or directions that may be used to program a computer or logic to implement the functions that are described. In other words, all the prose text herein, and all the drawing figures, together are intended to provide disclosure of instructions, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with computer system 130 using computing device 104 configured with an operating system and one or more application programs or apps; the computing device 104 also may interoperate with the computer system 130 independently and automatically under program control or logical control and direct user interaction is not always required. Computing device 104 broadly represents one or more of a smart phone, PDA, tablet computing device, laptop computer, desktop computer, workstation, or any other computing device capable of transmitting and receiving information and performing the functions described herein. Computing device 104 may communicate via a network using a software application, such as a mobile device application, stored on computing device 104, and in some embodiments, the device may be coupled using a cable 113 or connector to a sensor 112 and/or application controller 114. A particular user 102 may own, operate, or possess and use, in connection with system 130, more than one computing device 104 at a time.

The software application may provide client-side functionality, via the network to one or more mobile computing devices. In an example embodiment, computing device 104 may access the mobile application via a web browser or a local client application or app. Computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on computing device 104 which determines the location of computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, computing device 104 sends field data 106 to computer system 130 comprising or including, but not limited to, data values representing one or more of: a geographical location of the one or more fields, tillage information for the one or more fields, imagery data and/or other data relating to crops planted in the one or more fields, and soil data extracted from the one or more fields. Computing device 104 may send field data 106 in response to user input from user 102 specifying the data values for the one or more fields. Additionally, computing device 104 may automatically send field data 106 when one or more of the data values becomes available to computing device 104. For example, computing device 104 may be communicatively coupled to imaging system 115 or remote sensor 112 and/or application controller 114. In response to receiving data indicating that application controller 114 has caused imaging system 115 to collect imagery data of a field location, computing device 104 may send field data 106 including the imagery data for one or more field locations to computing system 130. Field data 106 identified in this disclosure may be input and communicated using electronic digital data that is communicated between computing devices using parameterized URLs over HTTP, or another suitable communication or messaging protocol. Portions of the description of the software application with respect to operations of computing device 104 are alternatively or in addition applicable to computer 116 and/or portions of imaging system 115.

A commercial example of a software application portions of which may be implemented on computing device 104 or computer 116 is CLIMATE FIELDVIEW, commercially available from The Climate Corporation, San Francisco, California The CLIMATE FIELDVIEW application, or other applications, may be modified, extended, or adapted to include features, functions, and programming that have not been disclosed earlier than the filing date of this disclosure. In one embodiment, the software application comprises an integrated software platform that allows a user, such as a grower, to make fact-based decisions for a horticultural operation because it combines historical data about the grower's fields with any other data that the grower wishes to compare. The combinations and comparisons may be performed in real time and are based upon scientific models that provide potential scenarios to permit the grower to make better, more informed decisions.

Figure 2B:
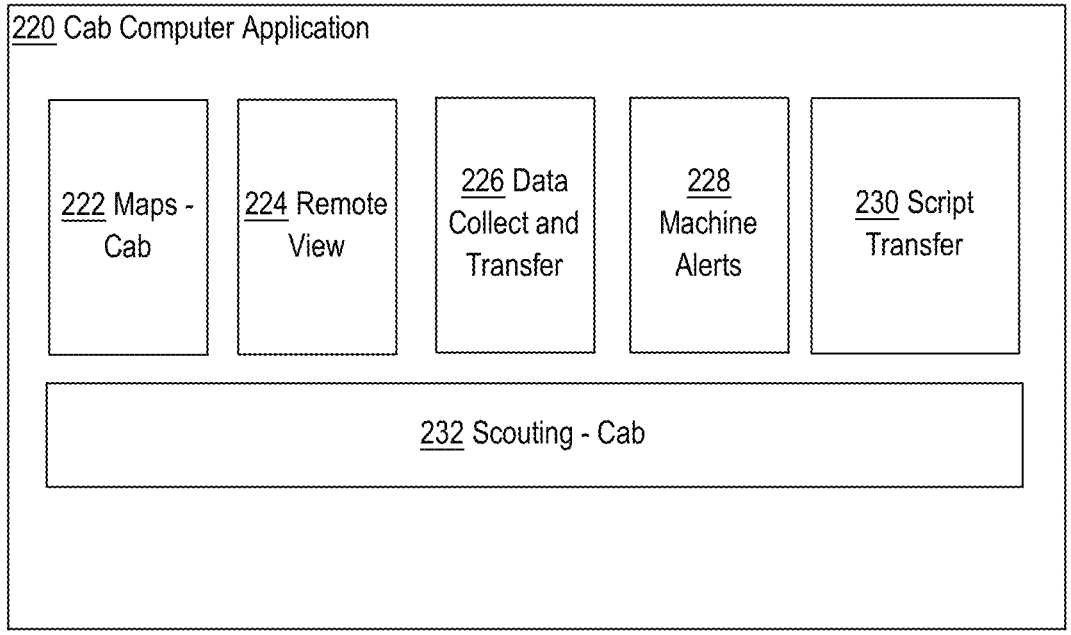

FIG. 2A and FIG. 2B illustrate two views of an example logical organization of sets of instructions in main memory when an example mobile application is loaded for execution. In FIG. 2A and FIG. 2B, each named element represents a region of one or more pages of RAM or other main memory, or one or more blocks of disk storage or other non-volatile storage, and the programmed instructions within those regions. In one embodiment, in FIG. 2A, a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from sensors 112, imaging system 115, external data 110, or third party systems via manual upload or APIs. Data types may include field boundaries, yield maps, as-planted maps, soil test results, as-applied maps, and/or management zones, among others. Data formats may include shape files, native data formats of third parties, image files, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides users with convenient information close at hand for reference, logging, and visual insights into field performance. In one embodiment, overview and alert instructions 204 are programmed to provide an operation-wide view of what is important to the user, and timely recommendations to take action or focus on particular issues. This permits the user to focus time on what needs attention, to save time and preserve yield throughout the season. In one embodiment, seeds and planting instructions 208 are programmed to provide tools for seed selection, hybrid placement, harvesting, and script creation, including variable rate (VR) script creation, based upon scientific models and empirical data. This enables growers to maximize yield or return on investment through optimized seed purchase, placement, population, and harvesting.

In one embodiment, script generation instructions 205 are programmed to provide an interface for generating scripts, including variable rate (VR) fertility scripts. The interface enables the creation of scripts for field implements, such as nutrient applications, planting, harvesting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to computer 116 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly, or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; downloading satellite images from multiple sources and prioritizing the images for the grower, graphical visualization of field locations including yield predictions generated from aerial imagery, among others. For example, field health instructions 214 may be programmed to provide pre-harvest recommendations or harvesting recommendations based on yield information produced from video imagery by yield monitor instructions 136.

In one embodiment, performance instructions 216 are programmed to provide reports, analysis, and insight tools using on-farm data for evaluation, insights, and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds, planting, or harvesting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of computer 116.

For example, referring now to FIG. 2B, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of FIG. 2B may be the same as for FIG. 2A and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the computing device 104, device 111, computer 116, or sensors 112 in the field and ingest, manage, and provide transfer of location-based scouting observations to the system 130 based on the location of the device 111 or sensors 112 in the field. In an embodiment, maps-cab instructions 222 may be programmed to provide map views of field locations that have been generated using aerial imagery produced by imaging system 115; remote view instructions 224 may be programmed to turn on, manage, and provide views of activity of the device 111 in real-time or near real-time to other computing devices connected to the system 130 via wireless networks, wired connectors or adapters, and the like; data collect and transfer instructions 226 may be programmed to turn on, manage, and provide transfer of data collected at sensors 112 or imaging system 115 to the system 130 via wireless networks, wired connectors or adapters, and the like; machine alerts instructions 228 may be programmed to detect issues with operations of the device 111 or other machine or tools and generate operator alerts; script transfer instructions 230 may be configured to transfer in scripts of instructions that are configured to direct operations of device 111 or the collection of data by imaging system 115; scouting-cab instructions 232 may be programmed to display location-based alerts and information received from the system 130 including yield data produced by yield monitor instructions 136 for particular field locations, based on the location of the computing device 104, device 111, computer 116, or sensors 112 in the field and ingest, manage, and provide transfer of location-based yield prediction data to the system 130 based on the location of the device 111 or sensors 112 in the field.

Figure 2C:
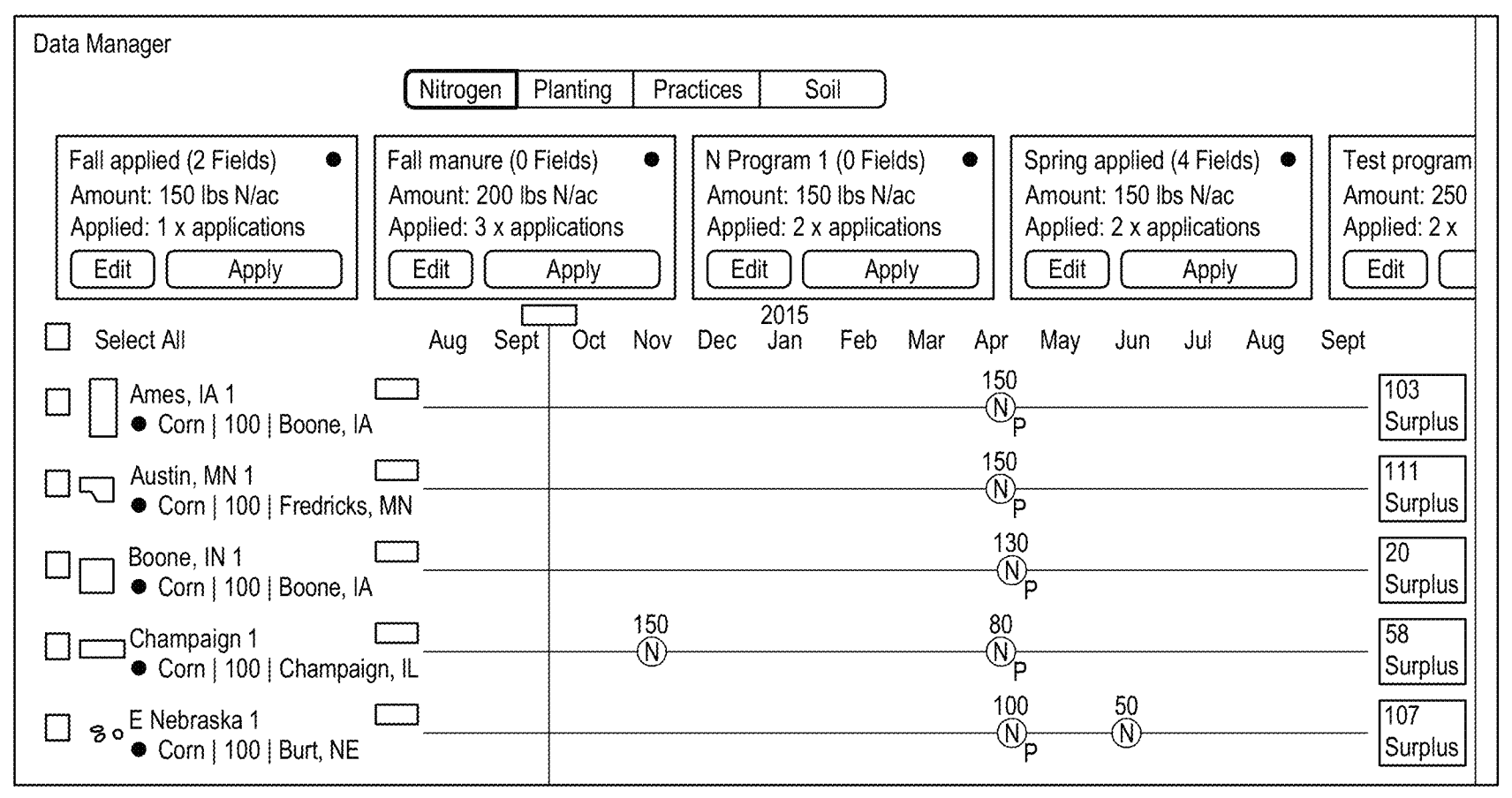

FIG. 2C depicts an example embodiment of a timeline view for data entry. Using the display depicted in FIG. 2C, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 2C, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 2C, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 2C, the interface may update to indicate that the "Spring applied" program is no longer being applied to the top field. While the nitrogen application in early April may remain, updates to the "Spring applied" program would not alter the April application of nitrogen.

FIG. 2D depicts an example embodiment of a spreadsheet view for data entry. Using the display depicted in FIG. 2D, a user can create and edit information for one or more fields. The data manager may include spreadsheets for inputting information with respect to Nitrogen, Planting, Practices, and Soil as depicted in FIG. 2D. To edit a particular entry, a user computer may select the particular entry in the spreadsheet and update the values. For example, FIG. 2D depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

2.3 Hardware Overview

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 3:
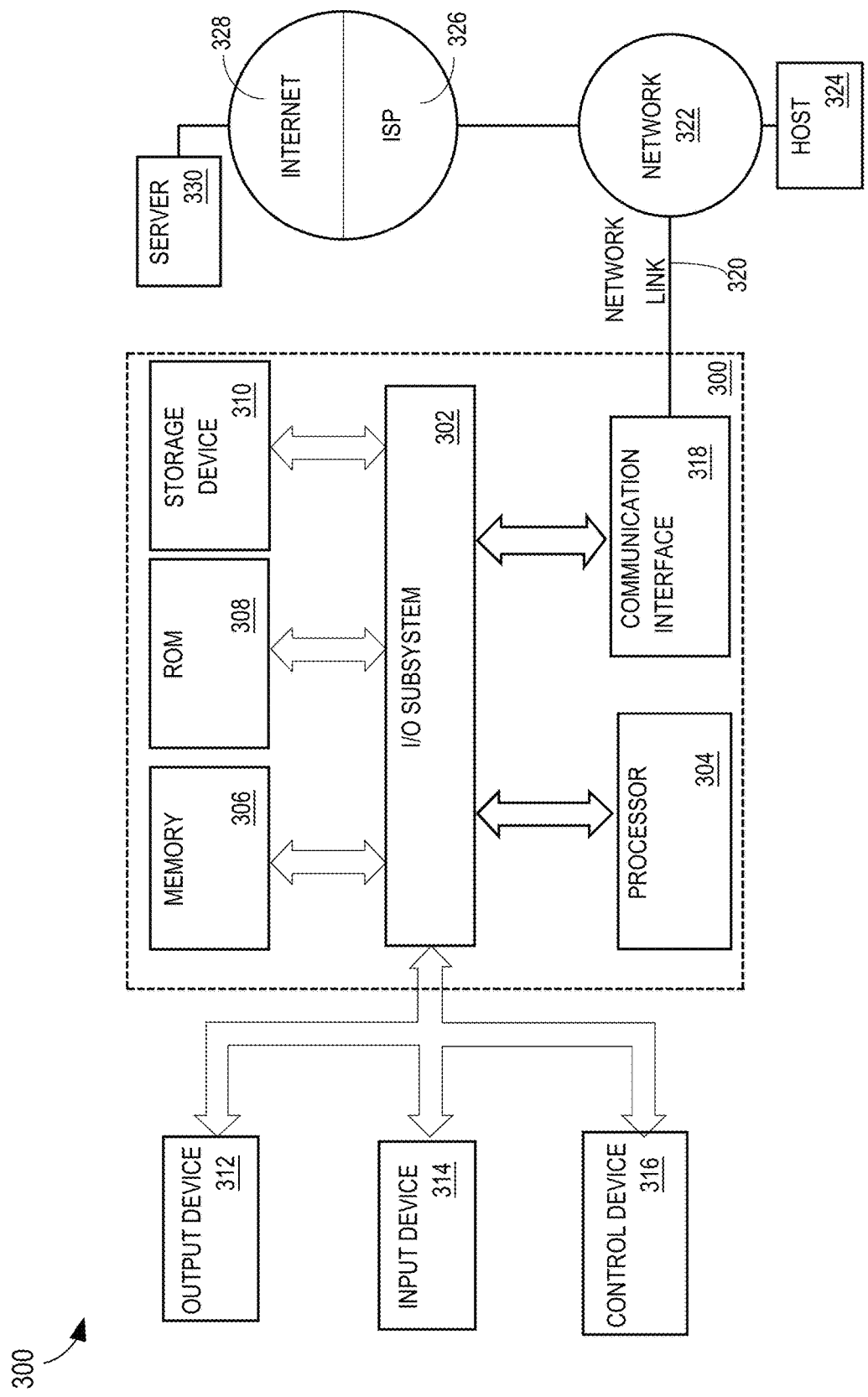
FIG. 3 is a block diagram that illustrates a computer system upon which an embodiment of the invention may be implemented.

For example, FIG. 3 is a block diagram that illustrates a computer system 300 upon which an embodiment of the present invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to I/O subsystem or bus 302 for storing information and instructions to be executed by processor 304. Main memory 306 also may be used for storing temporary variables or other intermediate information during execution of instructions to be executed by processor 304. Such instructions, when stored in non-transitory computer-readable storage media accessible to processor 304, render computer system 300 into a special-purpose machine that is customized to perform the operations specified in the instructions.

Computer system 300 and further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a liquid crystal (LCD) display, for displaying information to a computer user. An input device 314, including alphanumeric and other keys, is coupled to bus 302 for communicating information and command selections to processor 304. Another type of user input device is control device 316, such as a touchpad, a microphone, a haptic control device, a mouse, a trackball, or cursor direction keys for communicating direction information and command selections to processor 304 and for controlling cursor movement on display 312. An input device may have two degrees of freedom in two axes, a first axis (e.g., x) and a second axis (e.g., y), that allows the device to specify positions in a plane. Input device 314 may include various sensors, such as a gyroscope, accelerometer, or Global Positioning System (GPS) transceiver, which communicate information to processor 304.

Computer system 300 may implement the techniques described herein using customized hard-wired logic, at least one ASIC or FPGA, firmware and/or program logic which in combination with the computer system causes or programs computer system 300 to be a special-purpose machine. According to one embodiment, the techniques herein are performed by computer system 300 in response to processor 304 executing at least one sequence of instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying at least one sequence of instruction to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated-services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through at least one network to other data devices. For example, network link 320 may provide a connection through local network 322 to a host computer 324 or to data equipment operated by an Internet Service Provider (ISP) 326. ISP 326 in turn provides data communication services through the world-wide packet data communication network commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage device 310, or other non-volatile storage for later execution.

3. EXAMPLE—COMPUTER VISION-BASED MODEL

In an embodiment, the computer system 130 is programmed or configured to create a model that can determine yield information for a field, field location, or picking area from which a horticultural product has been harvested.

The model uses computer vision technology to identify individual instances of the harvested horticultural product based on inputs representative of video imagery of the harvested product in transit from its picking area to a harvester bin. In this context, a model is a set of data values, parameter values, and weight values that are stored in a data structure in memory of the computer system 130, in association with program instructions and/or configuration instructions that are capable of receiving input data parameters as digital data, executing transformations, and generating new digital output data that did not previously exist, using artificial intelligence and machine learning techniques. The data values, parameter values, and weight values are determined through a model training process. A model training process involves the processing of video imagery training data, which have been labeled with classification labels, by one or more computer-implemented mathematical algorithms, such as linear regression algorithms, statistical and/or probabilistic algorithms, to train the model and cause modification of weight values within the model so that the output data produced by the model after training is different than output data produced by the model before training.

Examples of classification labels include labels that identify particular classes, categories, grades, or growth stages, of particular horticultural products. For instance, a training sample of imagery that clearly depicts an instance of a particular fruit, for example, melon, might be labeled with the name of the fruit, melon, with the grade, size or growth stage of the melon, or simply as a positive training example. Likewise, a training sample of imagery that does not depict the particular fruit, grade, size, or growth stage might be labeled simply as a negative training example. Negative training examples can include examples of imagery in which no product is depicted as well as examples that depict different products or different grades, sizes, or growth stages of the product. For example, to train a model to detect melons, negative training examples might include imagery that depicts strawberries or oranges but not melons. Similarly, positive training examples might depict melons in various spatial orientations or at various stages of ripeness or with or without foliage occlusion. The preparation of a training data set, including the assignment of classification labels to training samples, can be performed using various techniques including semi-automated manual labeling.

In a particular embodiment, as explained in more detail below, the model includes a set of neural network-based models, where each neural network-based model has a set of model parameters and includes a set of layers, each layer includes a set of nodes, and each node has an associated activation function, weight value, and backpropagation function. In an embodiment, each of the neural network-based models is a deep learning model such that the training data can include raw imagery that is input directly into the models. During training, data values that have been extracted from video imagery and their corresponding classification labels are analyzed by the models, processed through the model layers, and associated with various predictive values by the activation functions of the various nodes of the models. A predictive value produced by a node indicates, for example, a mathematical likelihood that the data value input to the node corresponds to a known data value. The backpropagation function measures the difference between the output of the activation function and a ground truth value established by the classification label, and adjusts the weight value for the node and possibly the weight values of other nodes, in accordance with that difference.

For example, during model training, a particular node of a particular layer of a particular model may receive as input a particular data value and classification label pair, where the particular data value may have been extracted from multiband aerial imagery by an earlier model layer, or may be a computed value such as output of a node of an earlier model layer. In response to the input of the particular data value and label at the particular node, during model training, the weight value of the particular node, and perhaps weight values of other nodes, may be adjusted via the backpropagation function so that the node outputs a data value that indicates a high likelihood that the particular data value corresponds to the classification label. The trained model is tested, retrained, and validated to result in reliably accurate detection, by the computer system 130, of individual instances of a horticultural product in the video imagery.

Model training is performed using an appropriately-sized training data set. In one experiment, the size of the training data set included more than 3,000 examples of imagery that depicted the horticultural product of interest.

Once trained, tested, and validated, the model is accessed and used, by a computer-implemented module or process known as a machine-learned or machine learning-based classifier, to generate model output that is based on new or previously-unseen instances of video imagery. Yield as used herein may refer to quantitative and/or qualitative aspects of a harvested product.

Figure 4:
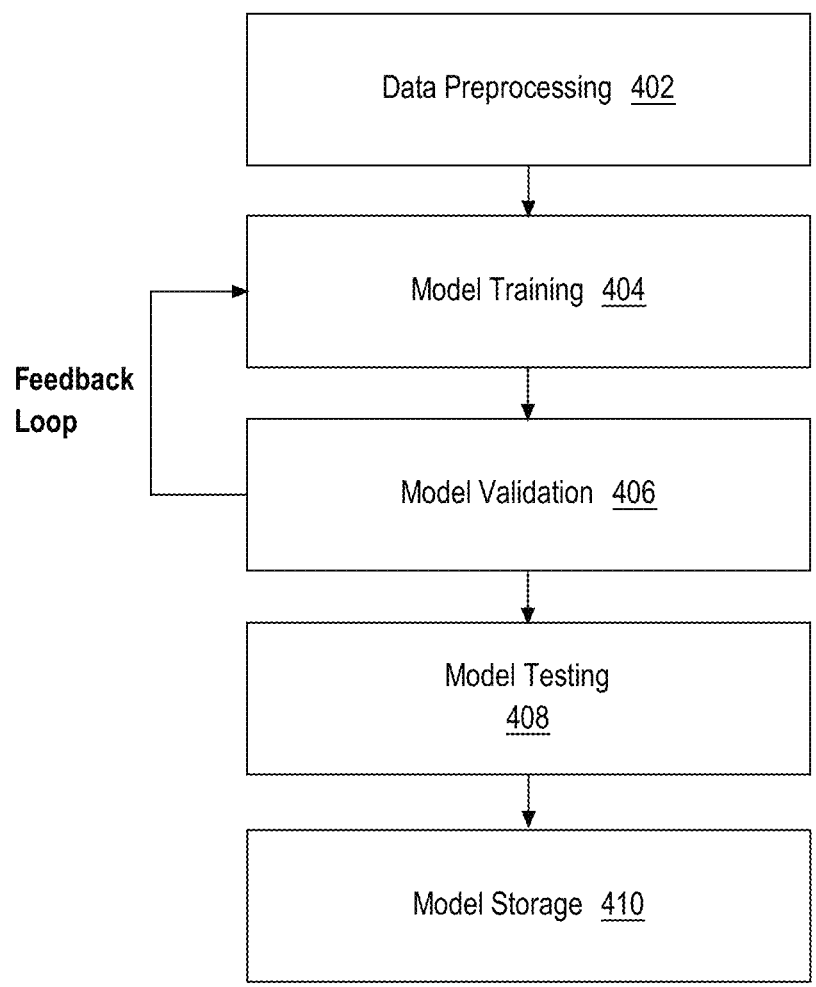
FIG. 4 illustrates a flow of a programmed process by which the example computer system generates one or more preconfigured models using data provided by one or more data sources.

FIG. 4 illustrates a flow of a programmed process by which the example computer system generates one or more preconfigured models using data provided by one or more data sources. FIG. 4 may serve as an algorithm or instructions for programming the functional elements of the computer system 130 to perform the operations that are now described. The process of FIG. 4 is illustrated and described using functional blocks or modules for ease of discussion, but implementations of the process of FIG. 4 may define and arrange the functional elements in any suitable manner.

At block 402, the computer system 130 is configured or programmed to implement preprocessing of digital video data received from one or more data sources, such as a camera mounted above a conveyor belt used to transfer harvested product from a picking area of a field to a harvester bin. The digital video data received from one or more data sources may be preprocessed for the purpose of removing noise, distorting effects, or confounding factors that could adversely affect the accuracy of data values extracted from the digital video data. Embodiments of data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

In some embodiments, the video imagery includes red-green-blue (RGB) imagery that has been automatically tagged with timestamp and geospatial or geographic location data during image capture. The terms geospatial and geographic location may be used interchangeably and as used herein may refer to data that identifies a location on the Earth's surface, such as longitude and latitude coordinates.

In some embodiments, a video camera made by, for instance, GoPro, and customized with a motion detection function, such as the SecurityCam software application by Wolfcoders, may be mounted above a harvester conveyor belt so that, in operation, the camera system may generate timestamped and geo-tagged video imagery of the conveyor belt (and whatever objects are being transported by the conveyor belt) when motion of the conveyor belt is detected. In some cases, pre-processing may include extracting geospatial data and timestamp data from the video imagery. Also, in some embodiments, pre-processing may include encoding the video image stream into a format that can be read and processed efficiently by components of computer system 130. For instance, an open source software library such as x264 or FFmpeg software may be used to encode the video imagery into a suitable compression format. Extraction of timestamp data and/or geospatial tags from the video imagery may be performed using optical character recognition (OCR) software such as Tesseract. Some embodiments may use portions of the image capture and processing technologies described in, for example, U.S. Pat. No. 10,438,343, which is incorporated herein by this reference.

At block 404, the computer system 130 is configured or programmed to implement model training. In an embodiment, model training includes transfer-learning a "background" object detection model to recognize, using computer vision technology, a particular horticultural product of interest, in video imagery. To do this, an initial pre-training step is performed, in which a background model is selected or created. A background model as used herein may refer to a model that has been trained for a general purpose, such as detecting common objects from an image containing one or more objects, rather than a specific classification objective, such as detecting a particular type of fruit or a particular grade, size, or growth stage of a horticultural product. In some embodiments, the YOLO real-time object detection system is trained using the Common Objects in Context (COCO) dataset along with the Darknet neural network framework to create the background object detection model.

Once the background object detection model has been created or pre-trained, a transfer learning process is used to tune the object detection model to recognize the particular horticultural product of interest. Transfer learning is a process by which a pre-trained model is adapted to a particular purpose. To perform transfer learning, the weights of some layers of a model can be frozen; that is fixed, or not allowed to be changed via back propagation, while the weights of the other model layers are allowed to be adjusted, when the specific-purpose training data is introduced during tuning. For example, since the lower layers of a convolutional neural network (CNN) learn low-level features within the image such as lines, edges, or contours, while the higher layers learn more abstract features of the image such as shapes, the frozen layers could be the initial layers to pick up more basic features among objects. Alternatively, transfer learning can be performed by using the pre-trained model as a start point in training a new model. Transfer learning can be implemented using any existing tools known to someone skilled in the art, such as the Keras package.

The object detection model is transfer-learned in this manner to produce a horticultural product-detection model capable of detecting individual instances of a particular horticultural product in video imagery, which could be represented by location coordinates within an image. For example, if the horticultural product of interest is melons, then the object detection model is tuned using positive and negative training examples for melons.

After the horticultural product-detection model has been tuned to recognize the horticultural product of interest in video imagery, at block 406, the model is validated. Model validation may include comparing model output for a portion of the training dataset to ground truth data. Model validation may return to model training block 404 via a feedback loop, for additional training to be performed if validation is unsuccessful. At block 408, the horticultural product-detection model is tested with previously unseen input data. At block 410, the computer system 130 is configured or programmed to store the horticultural product-detection model in computer memory for use as a machine learning-based classifier. For example, the stored model may be used in the yield map generation process of FIG. 5A, described below.

4. EXAMPLE—YIELD MONITORING AND MAPPING PROCESSES

4.1. Process Overview

FIG. 5A illustrates a flow of a programmed process by which the example computer system generates yield map data, which can be used by other apparatus with which the system may interoperate.

At block 504, the computer system 130 is configured or programmed to implement an image data extraction process on input that includes video data 502. An example of video data 502 is video imagery of a horticultural product of interest in transit from a picking location to a harvested location, where the imagery has been collected and pre-processed using, for example, portions of data preprocessing operations 402. Video data 502 is different than training data in that video data 502 is new or previously unseen video imagery, which has not been used to train the horticultural product detection model. Thus, portions of data preprocessing operations 402 that pertain to annotating video data with classification labels do not apply to video data 502.

In an embodiment, image data extraction process 504 divides video data 502 into its individual frames to produce frame data 506. For example, an instance of frame data 506 may include digital imagery that depicts portions of the horticultural product of interest while the product is in belt-assisted transit from a picking area to a harvester bin, as well as a frame identifier that uniquely distinguishes the frame from other frames in the same video imagery, as well as the frame-level timestamp data and geographic location data that is associated with the particular instance of frame data 506.

At block 508, the frame data 506 produced by image data extraction process 504 is input to a horticultural product detection model. The horticultural product detection model of process 508 is a computer vision-based machine-learned model that has been created using, for example, the process of FIG. 4, described above. The model of block 508 outputs product detection data 510 in response to input, into the model, of frame data 506.

Product detection data 510 includes annotated video data. The annotated video data includes digital annotation data indicative of individual instances of the horticultural product detected in the frames by the machine-learned model. An example of digital annotation data is bounding boxes, which are digitally drawn around each instance of the horticultural product detected by the model based on the location information of the instance, as noted above. As used herein, bounding box may refer to a computer-generated graphical element that is overlaid by horticultural product detection process 508 on an image to indicate a particular two-dimensional area of the image in which the model has detected an instance of the horticultural product of interest.

Product detection data 510 also includes the digital geographic location data and digital timestamp data associated with each frame. Thus, for a given frame of video data 502, product detection data 510 may include one or more bounding boxes that have been computer-drawn in the frame, digital geographic location data associated with the frame, and digital timestamp data associated with the frame.

Aspects of some embodiments of horticultural product detection process 508 are shown in FIG. 5B, FIG. 5C, FIG. 5D, and FIG. 5E, described below.

At block 512, product detection data 510 produced by horticultural product detection process 508 is analyzed by a product counting process to produce quantitative data. As part of product counting process 512, the computer system 130 is configured or programmed to count the number of bounding boxes in each frame of product detection data 510 and associate the counted number of bounding boxes with the frame via the frame identifier of frame data 506. Product counting process 512 considers each bounding box to correspond to one instance of a horticultural product such that the number of bounding boxes in a frame corresponding to the same horticultural product is indicative of the number of instances of the horticultural product detected in the frame. Product counting process 512 outputs product count data 514, which includes quantitative data indicative of particular counts of the individual instances of the horticultural product associated with particular frame identifiers. When frame data 506 includes particular timestamp data and particular geographic location data, product count data 514 may also include the timestamp data and geographic location data associated with particular frame identifiers.

At block 516, product detection data 510 produced by horticultural product detection process 508 is analyzed by a product quality measurement process. As part of product quality measurement process 516, in one embodiment, the computer system 130 is configured or programmed to obtain the height and width dimensions of each bounding box in a frame via the frame identifier of frame data 506. For each bounding box of a frame, product quality measurement process 516 uses the height and width measurements of the bounding box to calculate the size of the instance of horticultural product that the model detected within the bounding box.

For example, product qualitative measurement process 516 may measure bounding box height and width in pixels and then apply a pre-determined scaling factor, such as a multiplier that is dependent on the distance between the camera and the horticultural product, to the pixel-based measurements to convert those measurements to product sizes using a product-relevant unit of measurement such as square centimeters or square inches. Product qualitative measurement process 516 outputs product qualitative data 518, which includes qualitative data indicative of, for example, particular sizes of the individual instances of the horticultural product associated with particular frame identifiers. Other examples of qualitative data that may be produced by product qualitative measurement process 516 include product grade data. For instance, product grade data may be derived from product size data and/or product color data as indicated in the pixel data extracted from the video imagery. Depending on the type of horticultural product and the type of sensor used, product qualitative measurement process may produce one or multiple different qualitative measures. When frame data 506 includes particular timestamp data and particular geographic location data, product qualitative data 518 may also include the timestamp data and geographic location data associated with particular frame identifiers.

Figure 6A:
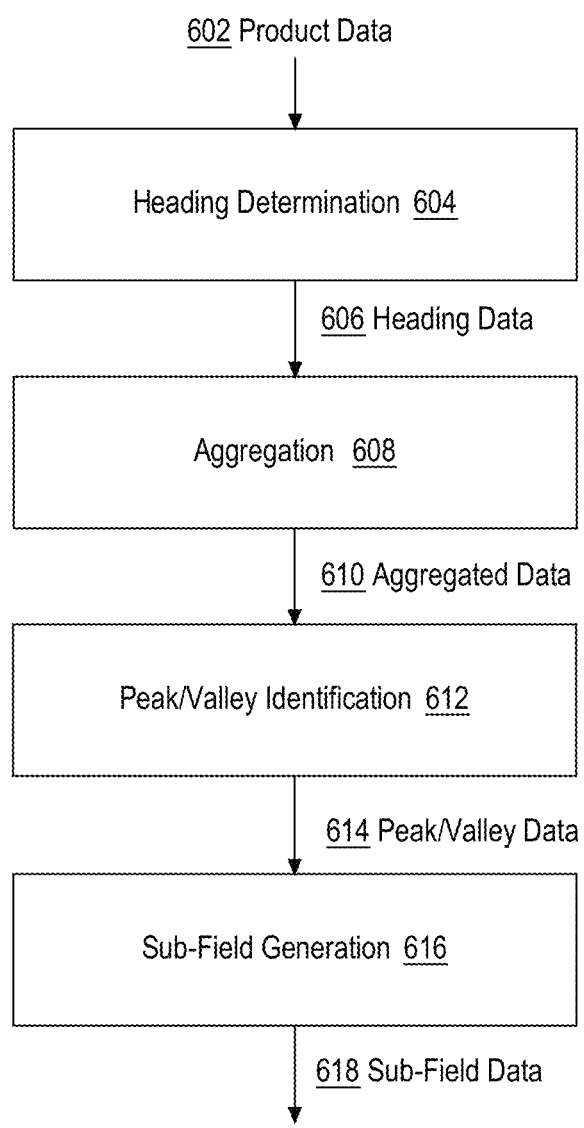
FIG. 6A illustrates a flow of a programmed process by which the example computer system maps product data to picking area data, which can be used by other apparatus with which the system may interoperate.

At block 520, product count data 514 produced by product counting process 512 and, if available, product size data 518 produced by product quality measurement process 516, are analyzed by a map generation process. As part of map generation process 520, the computer system 130 is configured or programmed to, using the digital timestamp data, map the quantitative data, for example product count data 514 and/or product size data 518, to geographic location data to produce yield map data 522. An embodiment of map generation process 520 is shown in FIG. 6A, described below.

Figure 7A:
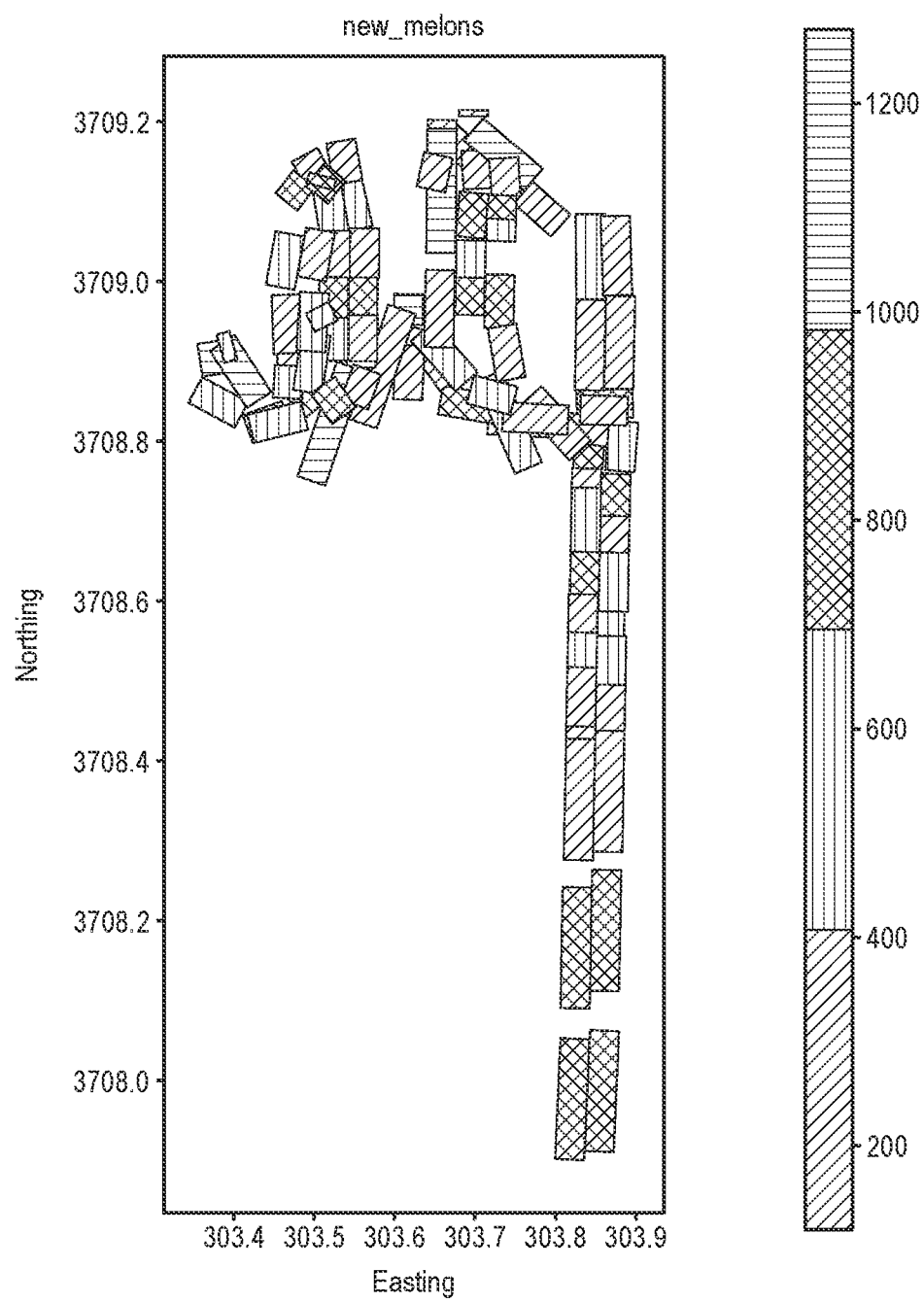
FIG. 7A depicts an example of a yield map in which differences in raw product yield, a simple count of aggregate product count per picking area, are identified in picking areas, and the picking area yields are plotted by longitude and latitude.
Figure 7B:
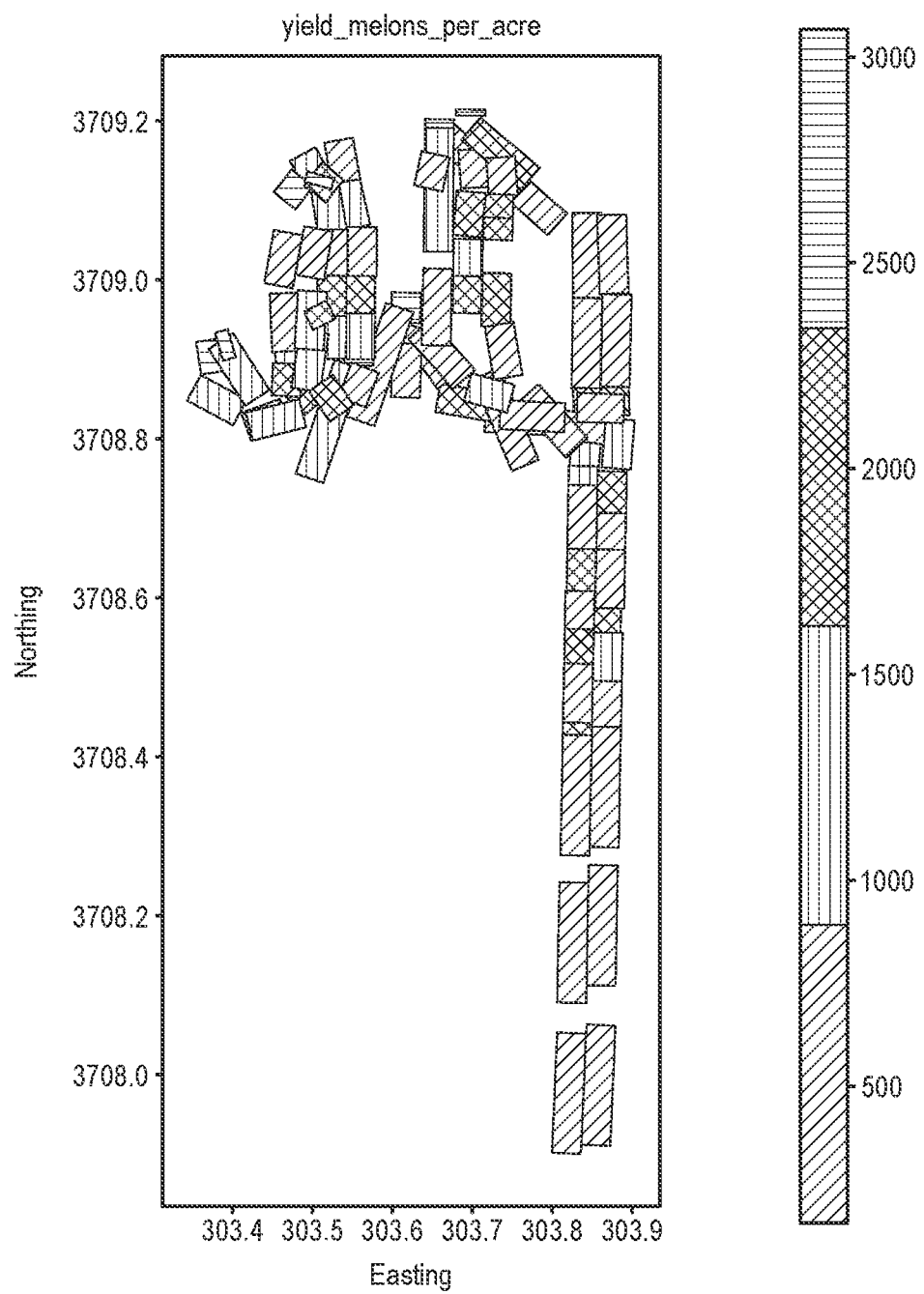
FIG. 7B depicts an example of a yield map in which differences in yield per acre are identified in picking areas, and the picking area yields are plotted by longitude and latitude.

At or subsequent to block 520, the computer system 130 is configured or programmed to output the yield map data 522 in a form of electronic communication that is capable of being used by a remote device to control an agricultural or horticultural operation. Examples of yield maps are shown in FIG. 7A and FIG. 7B, described below. For instance, portions of yield map data 522 may be incorporated into one or more scripts that may be provided to an application controller 114. The application controller 114, which is communicatively coupled to computer system 130 via the network(s) 109, is programmed or configured to receive the yield map data 522 via the one or more scripts. The one or more scripts containing yield map data 522 are used to control an operating parameter of a device, vehicle or implement, such as computing device 104, apparatus 117 or device 111, from the computer system 130. For instance, a controller area network (CAN) bus interface may be used to enable communications from the computer system 130 to the computer 116 via the network(s) 109 or from the computer 116 to the apparatus 117. The network(s) 109 may be used to enable communications from the imaging system 115 to the computer system 130, from the computer system 130 to the imaging system 115, from the computer system 130 to the computing device 104 or the computer 116, from the computing device 104 or the computer 116 to the computer system 130.

4.2. Horticultural Product Detection Examples

FIG. 5B, FIG. 5C, FIG. 5D, and FIG. 5E illustrate aspects of a programmed process by which the example computer system detects products in video imagery, which can be used by other apparatus with which the system may interoperate.

Figure 5B:
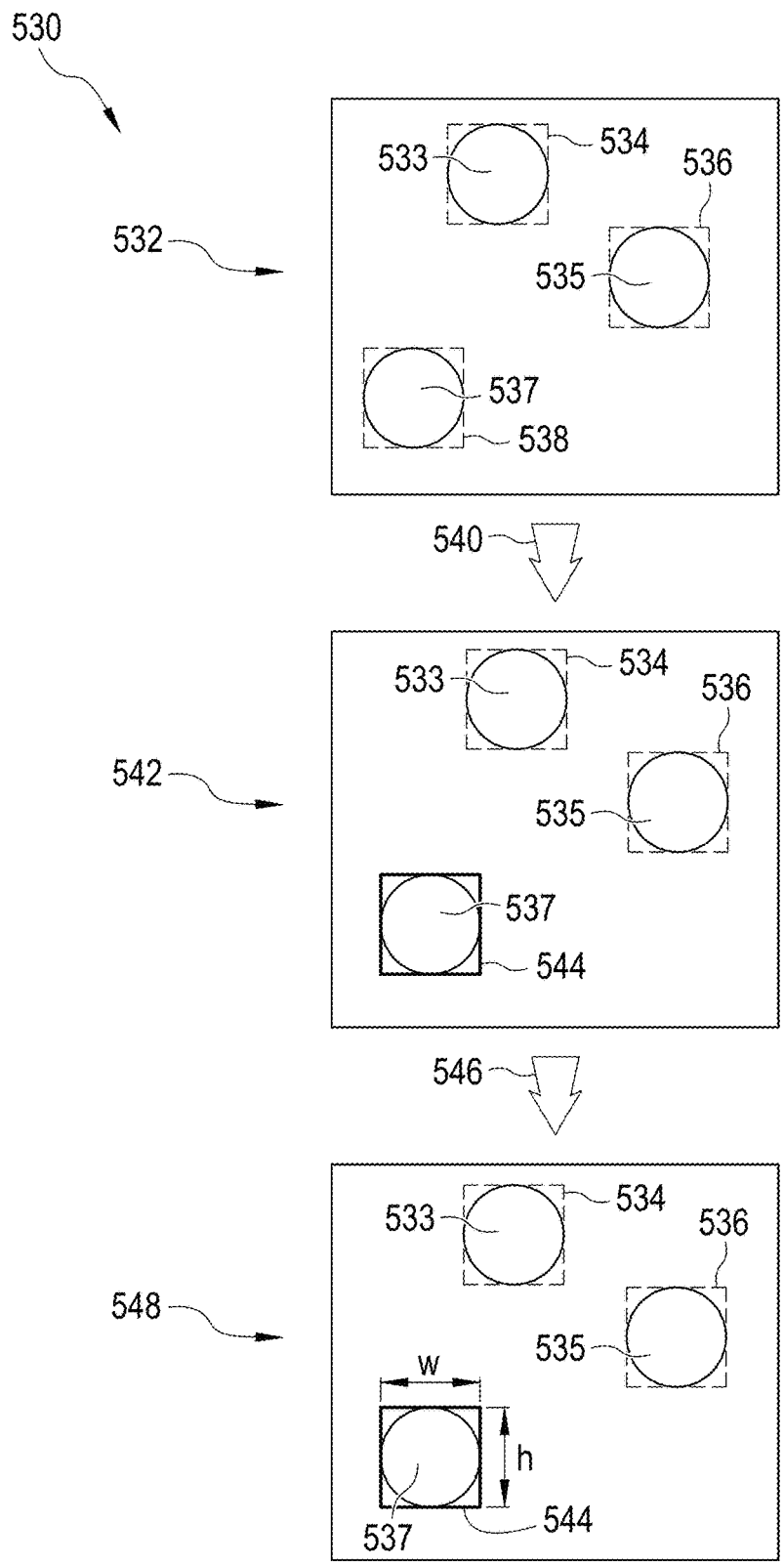
FIG. 5B illustrates an example of computer vision-based horticultural product detection, counting, and sizing that is performed on video imagery that has been captured during a harvesting operation.

FIG. 5B illustrates an example of computer vision-based horticultural product detection and sizing that is performed on video imagery that has been captured during a harvesting operation, stored in memory, and input to the computer system 130. The images 532, 542, and 548 may demonstrate the result of the detection process from executing the machine discussed in Section 3 above, for example.

In FIG. 5B, a processing sequence 530 of frames 532, 542, 548 may be outputted by the machine-learned model as digital annotation data. Frames 532, 542, and 548 correspond to the same frame captured at a particular point in time. The frame has been captured, for example, by a video camera mounted above a conveyor belt upon which instances of a horticultural product, 533, 535, 537, have been placed. The field of view of the video camera includes the area of the conveyor belt directly below the camera. When the conveyor belt is in operation, the video camera captures instances of the horticultural product as they pass through the field of view. The illustrations of frames 532, 542, 548 are representative of the camera's field of view.

In detection image 532, a computer vision-based horticultural product detection process such as the process described above with reference to FIG. 5A detects individual instances of the horticultural product of interest, 533, 535, 537, in the field of view and draws corresponding bounding boxes 534, 536, 538 around each of the instances, respectively. The process may use a particular graphical element to draw the bounding boxes 534, 536, 538 to indicate that the instances of product have been detected but not yet counted. For example, the process may use color-coded bounding boxes to distinguish among instances of product that have been detected but not yet counted or sized, instances of product that have been detected and counted but not yet sized, and instances of product that have been detected, counted, and sized.

Arrow element 540 represents an increment to the next step of the annotation process on the frame. In counting image 542, product instance 537 has been both detected and counted. The computer system 130 indicates that product instance 537 has now been counted by changing bounding box 538 to a different graphical element, bounding box 544. As an example, the computer system 130 may have drawn bounding box 538 using one color, such as yellow, and after the product instance has been counted, drawn bounding box 544 using a different color, such as red. The computer system 130 increments a count of product instances to reflect the counted instance 537 and stores the incremented count in memory. While counting image 542 is described with respect to a graphical display for the purpose of providing a clear implementation, embodiments may include the system storing data indicating that the individual detected item has been counted. The system may additional increment a counter identifying a total number of counted items.

Arrow element 546 represents an increment to the next step of the annotation process on the frame. In sizing image 548, the height and width dimensions of bounding box 544 are measured, after product instance 537 has been both detected and counted. For example, the box may comprise a lower value identifying a location of bottommost portion of the product, an upper value identifying a location of an uppermost portion of the product, a left value identifying a location of a leftmost portion of the product, and a right value identifying a location of the rightmost portion of the product. The height may then be computed as a difference between the upper value and the lower value while the width is computed as a difference in the left value and the right value. The computer system 130 may indicate that product instance 536 has now been sized by associating the bounding box dimension data with a bounding box identifier that uniquely distinguishes bounding box 544 from other bounding boxes, and then storing the bounding box identifier and bounding box dimension data in memory. The bounding box dimension data may be converted to product measurements using a product-relevant unit of measurement prior to storing.

Figure 5C:
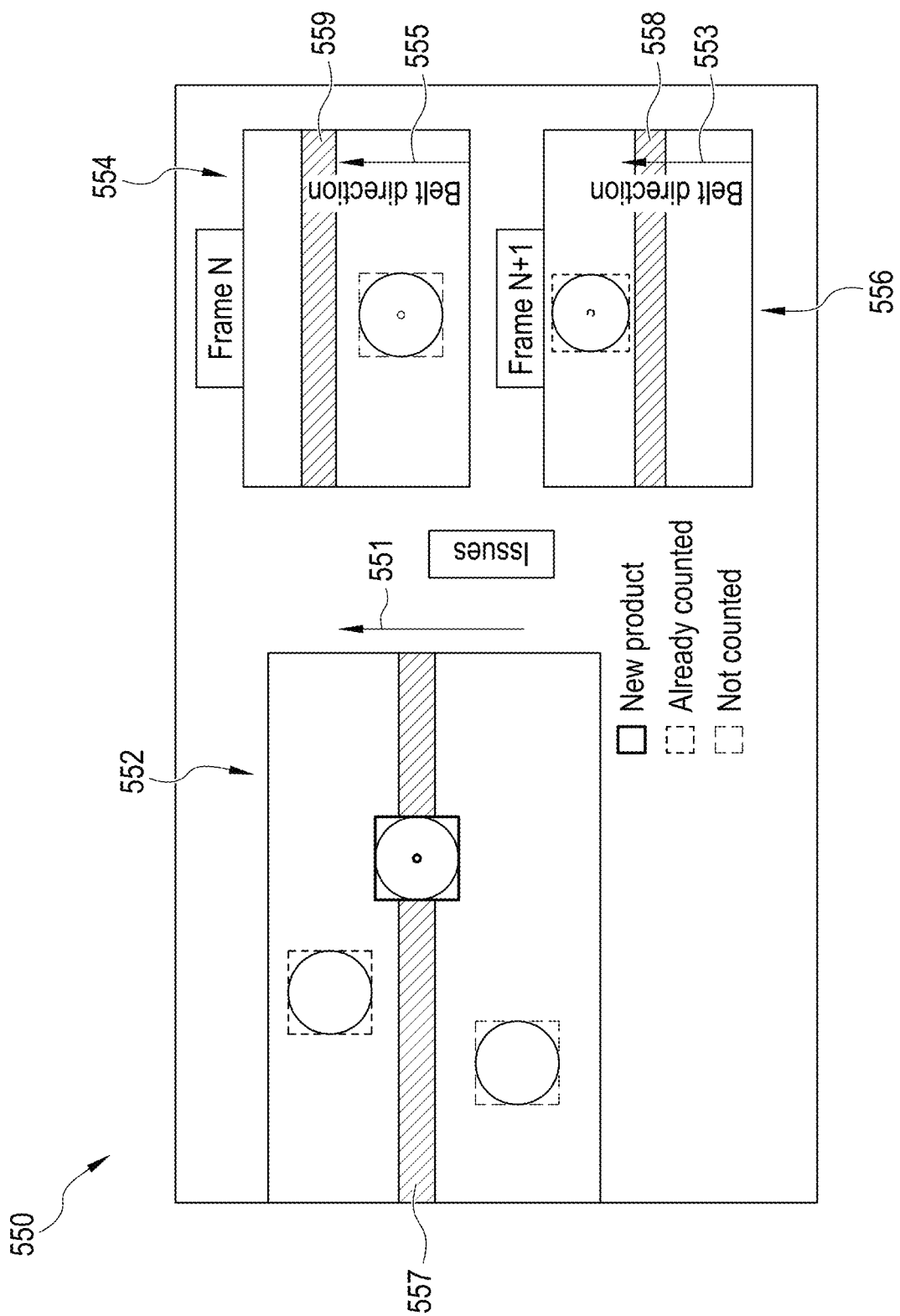
FIG. 5C illustrates an example of an algorithm for performing computer vision-based horticultural product counting on video imagery that has been captured during a harvesting operation.

FIG. 5C illustrates an example of computer vision-based horticultural product detection and sizing that is performed on video imagery that has been captured during a harvesting operation, stored in memory, and input to the computer system 130.

In the example of FIG. 5C, frame 552 in 550 illustrates a product instance detection and counting scenario, and frames 554 and 556 in 550 illustrate another product instance detection and counting scenario. In frames 552, 554, and 556, elements 557, 558, 559 each represent a processing window within the frame, in which the computer system 130 performs the product instance counting operation, and arrows 551, 553, 555 indicate the direction in which the conveyor belt upon which the product instances have been placed is traveling. For example, the system may be configured to identify and count new products that appear in the processing window and change an identifier on the product from "not counted" to "new product" as the product is counted. In this manner, the system keeps track of the counting of individual products as they are counted to ensure multiple products are not counted twice. Frame 552 illustrates a correct operation of the product instance and counting processes, in that an already counted product instance has moved past the processing window 557, a detected product instance that is currently being counted is within the processing window 557, and a detected but uncounted product instance has not yet passed through the processing window 557. Frames 554 and 556 illustrate a scenario in which the belt speed of the conveyor belt may be faster than the frame rate. In frame 554, the product instance has been detected but not yet counted. Frame 556 captures the product instance after it has already passed through the processing window. As a result, the product instance is incorrectly marked as already counted even though it has not been counted. An example of a solution to the problem of unpredictable conveyor belt speed is shown in FIG. 5E, described below.

Figure 5D:
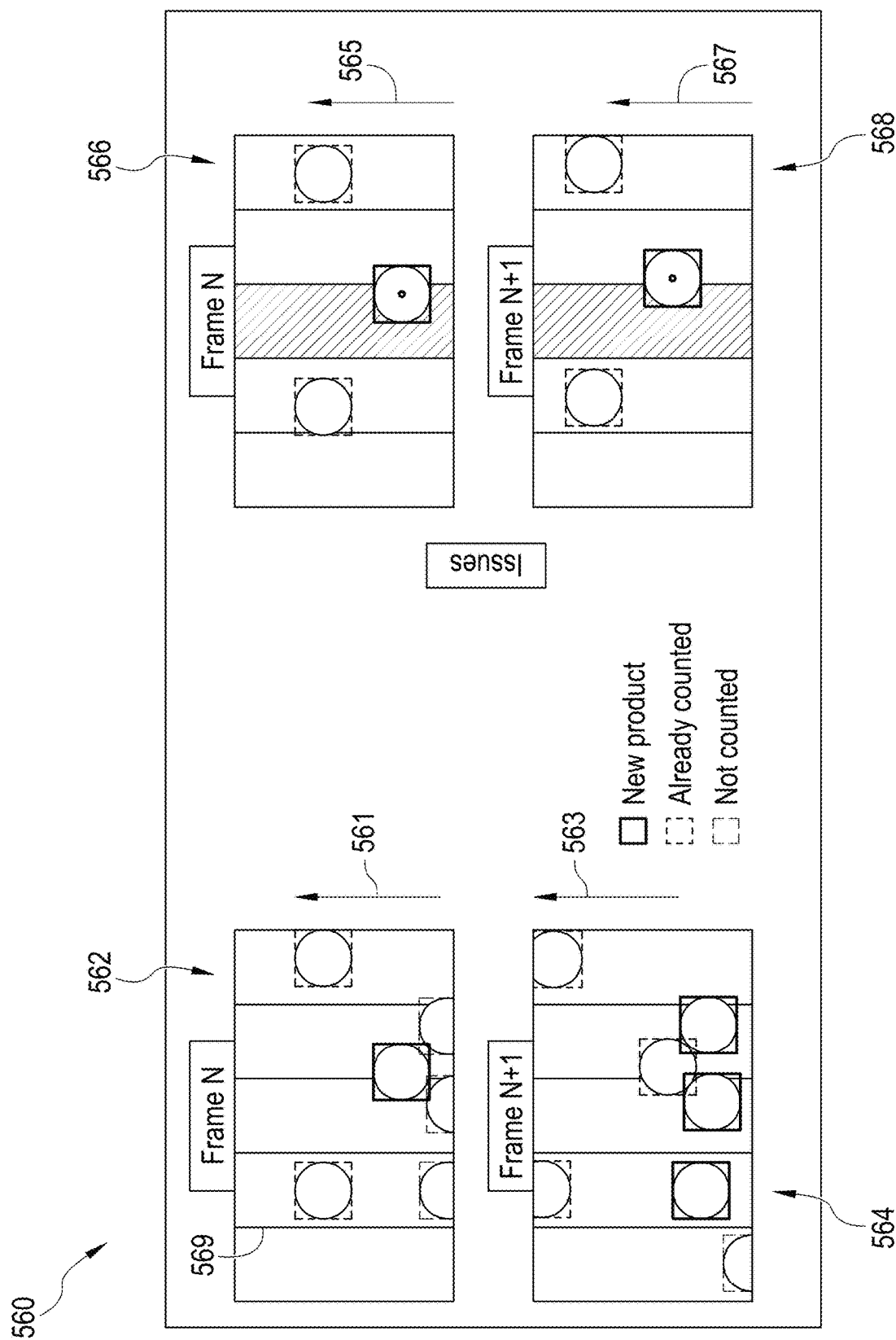
FIG. 5D illustrates an example of an algorithm for performing computer vision-based horticultural product counting on video imagery that has been captured during a harvesting operation.
Figure 5E:
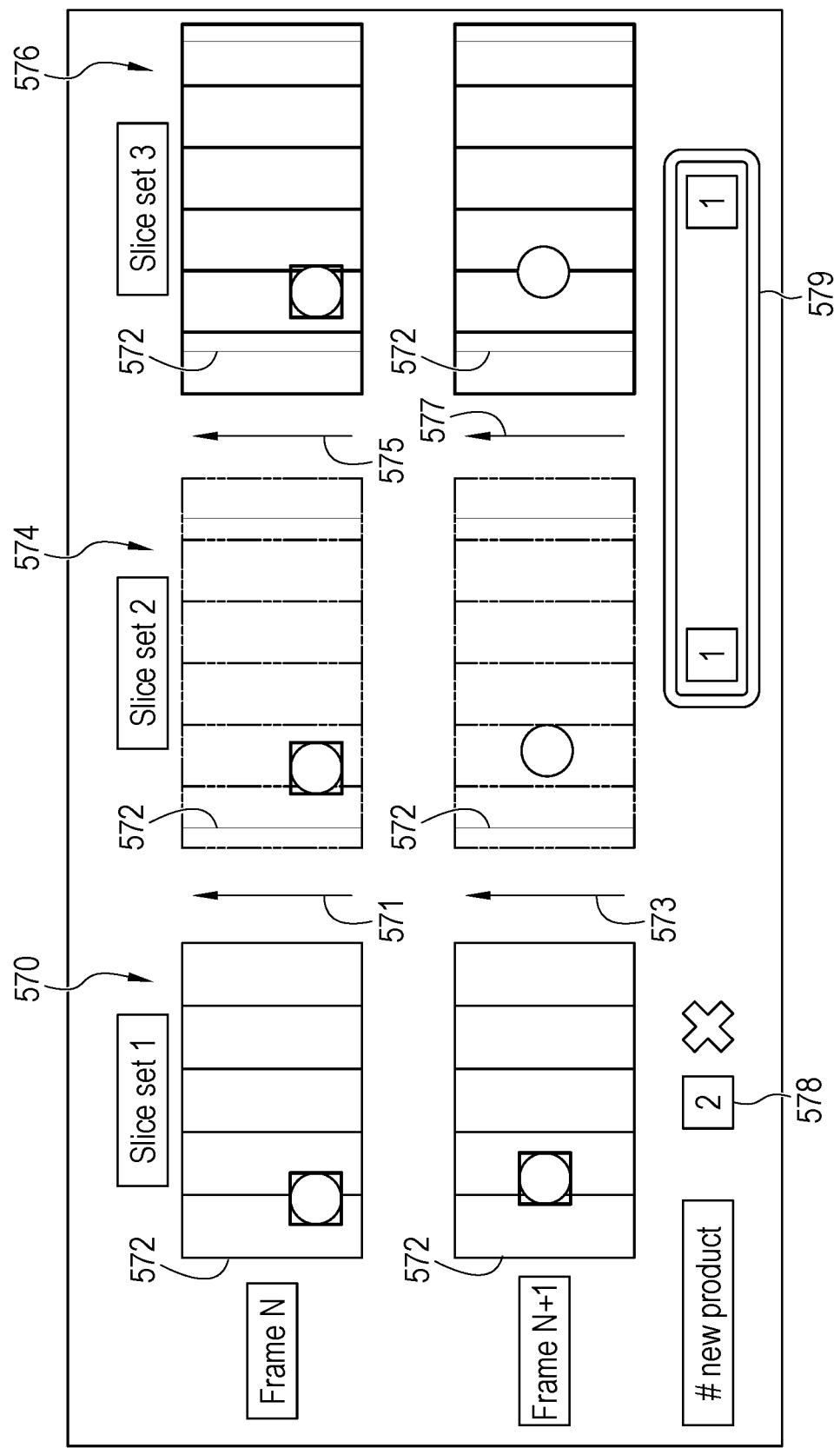
FIG. 5E illustrates an example of an algorithm for performing computer vision-based horticultural product counting on video imagery that has been captured during a harvesting operation.

FIG. 5D illustrates an example of computer vision-based horticultural product detection and sizing that is performed on video imagery that has been captured during a harvesting operation, stored in memory, and input to the computer system 130.

In the example of FIG. 5D, frames 562, 564, 566 and 558 illustrate particular product instance detection and counting scenarios 560 and arrows 561, 563, 565, 567 indicate the direction of travel of a conveyor belt carrying product instances. The counting process has divided the field of view of each of the frames 562, 564, 566 and 558 into a series of vertical lanes, which are illustrated in FIG. 5D as vertical lines such as line 569. Each individual vertical lane has a width that is less than the total width of the field of view and the total width across all vertical lanes is the same as the width of the field of view. Therefore, as opposed to the process illustrated in FIG. 5C, not just a single processing window within the field of view is considered by the entire field of view is considered in the hopes that no detected product will be skipped in the counting process. In an embodiment, the system uses the vertical lanes to perform the counting, identifying new products in each lane as they appear and tracking the product in the vertical lane as already counted until it disappears from view. For instance, in frame 562, the leftmost rectangle has zero identified products while the second from the left has one already counted product and one detected, but not counted product. In frame 564, a new product is identified in the leftmost rectangle and the second from the left rectangle includes one that is leaving the frame and one that is being counted.

Frames 562, and 564 illustrate a correct operation of the counting process, in which product instances are correctly indicated as already counted, detected, and newly counted, and detected but not yet counted, in both frames. Frames 566, 568 however illustrate an operation of the product instance counting process in which a product instance is detected in two different vertical lanes in successive frames 566 and frame 568, and thus may be double-counted. An example of a solution to the problem of unpredictable conveyor belt speed is shown in FIG. 5E, described below.

FIG. 5E illustrates an example of computer vision-based horticultural product detection and sizing that is performed on video imagery that has been captured during a harvesting operation, stored in memory, and input to the computer system 130.

In the example of FIG. 5E, frame sequences 570, 574, 576 illustrate particular product instance detection and counting scenarios and arrows 571, 573, 575, 577 indicate the direction of travel of a conveyor belt carrying product instances. Element 572 represents an edge of the field of view in each of the frames. Frame sequence 570 utilizes a slice set 1 in which the vertical lanes are defined so that the left-most edge of the left-most vertical lane is aligned with the edge of the field of view 572, the right-most edge of the right-most vertical lane is aligned with the right-side edge of the field of view, each of the lanes has the same width, and the total width across all lanes is the same as the width of the field of view. Terms such as left, right, vertical, before and after are used for ease of discussion with respect to the illustrations. In practice, the spatial orientation may vary; for example, in an implementation, the edge described as "left" herein may actually be on the right, and so on.

With regard to product instance count 578, it can be seen that using only slice set 1 to define vertical lanes resulted in a double count of the detected product instance because the product instance was detected as new in two different vertical lanes due to lateral movement of the product instance during motion of the conveyor belt. In contrast, product instance count 579 generated using slice set 2 and/or slice set 3 resulted in an accurate count of one product instance in each case. The width of the vertical lanes is constant across all 3 slice sets, but there is an additional vertical lane (or slice) added in sets 2 and 3. The additional vertical lane shifts the slice sets horizontally in sets 2 and 3 without omitting any portion of the field of view.

As such, in slice set 2, the right-most vertical lane extends to the right beyond the right-most edge of the field of view by an amount that is greater than the amount by which the left-most vertical lane extends beyond the left-most edge of the field of view 572. In slice set 3, the left-most vertical lane extends to the left beyond the left-most edge of the field of view by an amount that is greater than the amount by which the right-most vertical lane extends beyond the right-most edge of the field of view. Using multiple slice sets, for example at least two of the slice sets shown in FIG. 5E, can improve the accuracy of the product counting process by accounting for lateral movement of product instances during the belt-assisted transport, variations in belt speed, and other issues.

Figure 5F:
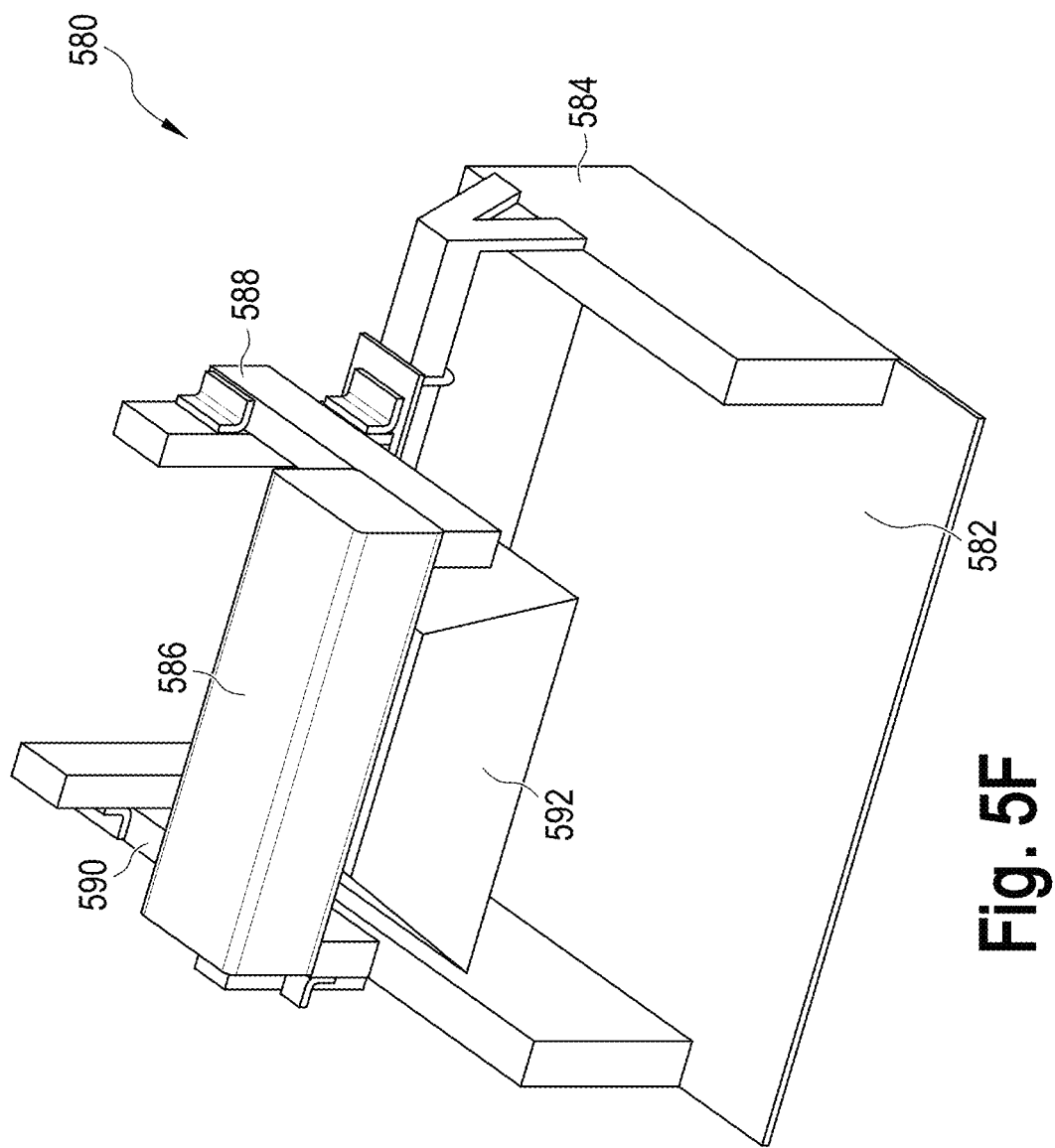
FIG. 5F illustrates an example apparatus by which video imagery that may be used by the example computer system may be captured.

To implement the multiple slice sets, the computer system 130 implements the slice sets as digital graphical overlays on the frames. The graphical overlays become part of the frame data that is used as input to the product detection model. The model uses the graphical overlays as guides for detecting new instances of product. For example, the system may be configured to identify a product as a new product (to count it in Frame N+1) only if the product would be considered a new product in each of the vertical slices which are applied to the same frames of data. For instance, while the product would be identified as a new product in frame sequence 570, the product would not be identified as a new product in either frame sequence 574 or frame sequence 576. Thus, the system would not identify the product as a new product as the product is only considered a new product in set of vertical slices. FIG. 5F illustrates an example apparatus 580 by which video imagery that may be used by the example computer system may be captured. The apparatus 580 is supported above a conveyor belt 582 such that the conveyor belt 582 can move freely. The apparatus 580 includes a support having a pair of opposing support members 584 positioned above opposite sides of the conveyor belt, a cross bar that extends across the width of the conveyor belt, and a pair of support arms 588, 590, which are supported by the cross bar. A camera apparatus 586 is mounted to the support arms 588, 590 so that a lens of a digital video camera faces the top surface of the belt 582. A hood 592 defines the field of view for the lens of the video camera. The apparatus 580 may include a motion detector so that the video camera captures images only when the conveyor belt is in motion. The digital video imagery captured by the apparatus is stored in memory. For example, the digital video imagery may be stored initially in memory of the camera, and then transferred to, for example cloud storage, which is accessible by the computer system 130.

4.3. Yield to Picking Area Mapping Process

FIG. 6A illustrates a flow of a programmed process by which the example computer system maps product data to picking area data, which can be used by other apparatus with which the system may interoperate. FIG. 6A may serve as an algorithm or instructions for programming the functional elements of the computer system 130 to perform the operations that are now described. The process of FIG. 6A is illustrated and described using functional blocks or modules for ease of discussion, but implementations of the process of FIG. 6A may define and arrange the functional elements in any suitable manner.

At block 604, the computer system 130 is configured or programmed to implement a heading determination process. Heading determination process 604 takes as input product data 602. Product data 602 includes time series data that includes product detection data 510 and at least one of product count data 514 and product size data 518. For example, product data 602 includes, for each instance of timestamp data, product count data 514 and/or product size data 518 associated with that particular instance of timestamp data. A particular instance of timestamp data may correspond to a particular frame of video imagery.

The heading determination process 604 determines, relative to north, the direction of travel of the harvester apparatus to which a separate video camera that captured the video imagery used to produce the product data 602 was attached. In an embodiment, heading determination process 604 obtains the heading data from computer memory. Additionally or alternatively, the heading data may be determined based on current and/or previous GPS coordinates. Heading determination process 604 outputs heading data 606.

At block 608, using the heading data 606, an aggregation process aggregates the geographic location data and product count data over longer time chunks. For example, prior to aggregation process 608, geographic location data and product count data are associated with frame-level timestamp data. Thus, the amount of geographic location data and product count data is determined by the frame rate of the video camera. Since the harvester apparatus carrying the video camera is a slow-moving vehicle, such as moving only every 30 seconds to go to the next location and otherwise stationary while picking products at the current location and loading the picked products onto a conveyor belt, the aggregation process 608 aggregates the frame-level data into larger time chunks, such as 30-second chunks, to produce aggregated data 610. For example, the system may aggregate a count of the product and/or average product size over a 30 second interval and associate it with an average location and/or heading direction of the harvester apparatus over the 30 second interval.

Aggregated data 610 is time series data that includes the aggregated product count data and geographic location data according to the larger time chunks. Aggregation process 608 outputs the aggregated data 610.

At block 612, using the aggregated data 610, a peak/valley identification process generates a plot of the aggregated product count data over the larger time chunks. For example, peak/valley identification process 612 plots product counts per 30-second time intervals of the timestamp data. Examples of plots that may be generated by peak/valley identification process 612 are shown in FIG. 6B and FIG. 6C, described below.

Figure 6B:
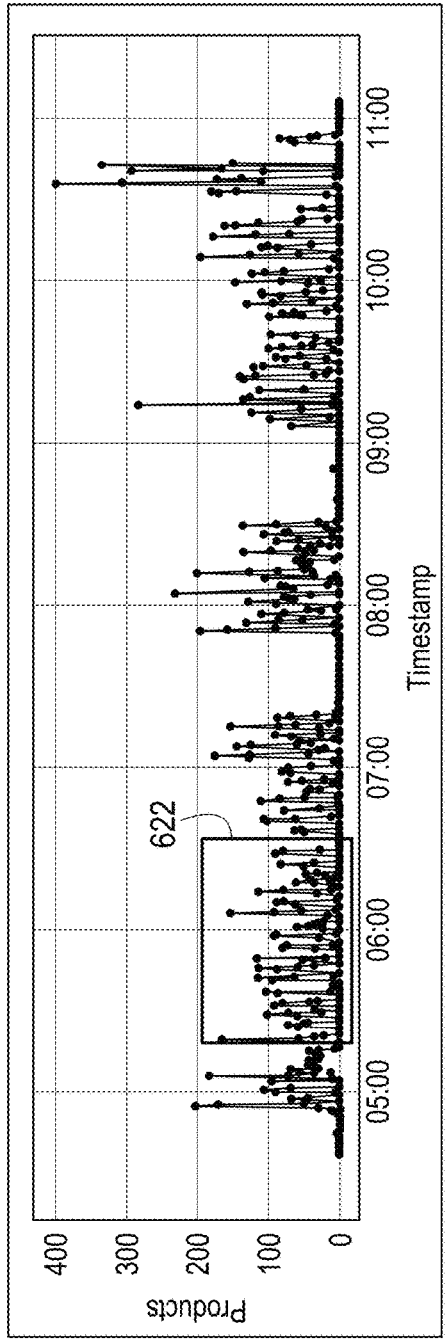
FIG. 6B depicts an example of plots that may be generated by a peak/valley identification process.
Figure 6C:
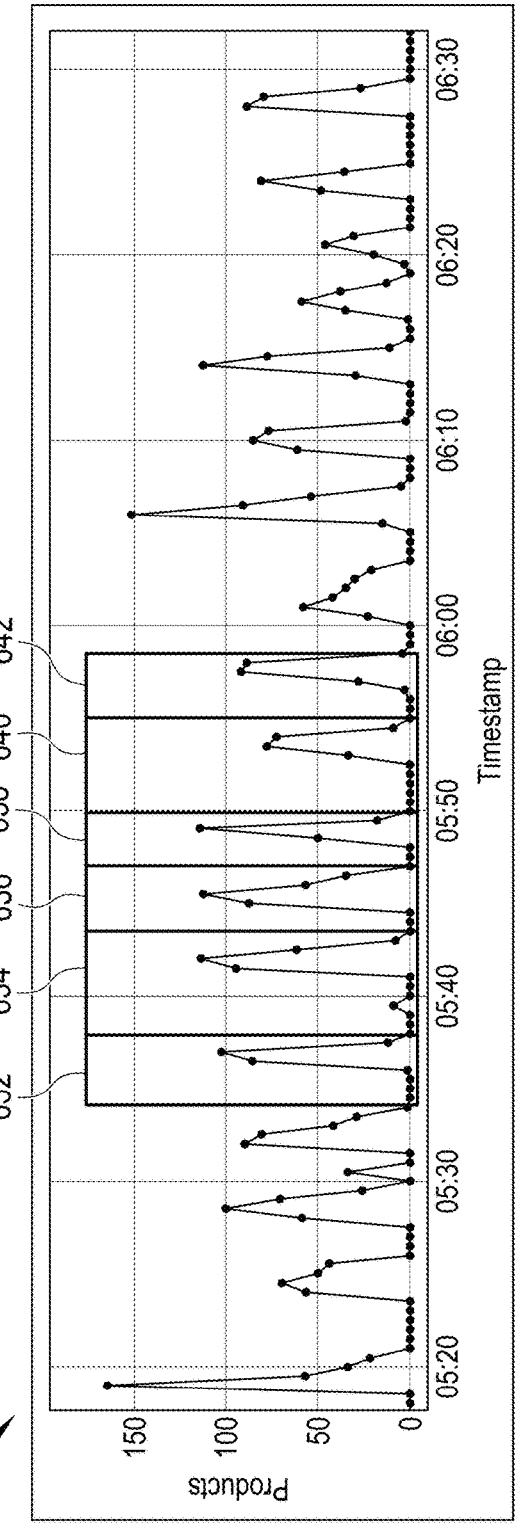
FIG. 6C depicts an example of plots that may be generated by peak/valley identification process.

Using a plot such as FIG. 6B or FIG. 6C, peak/valley identification process 612 identifies portions of the plot in which the product count is greater than zero, and identifies the starting and ending timestamps of each of those portions. The system considers portions of the plot in which the product count is zero to be periods in which the conveyor belt is not operational, in embodiments in which the operation of the video camera is triggered by motion of the conveyor belt. As such, peak/valley identification process 612 ignores time intervals in which the product count is zero. Peak/valley identification process outputs, for each time interval in which the product count is greater than zero, the total product count value and the corresponding starting and ending timestamp data for that time interval, as peak/valley data 614.

Figure 6D:
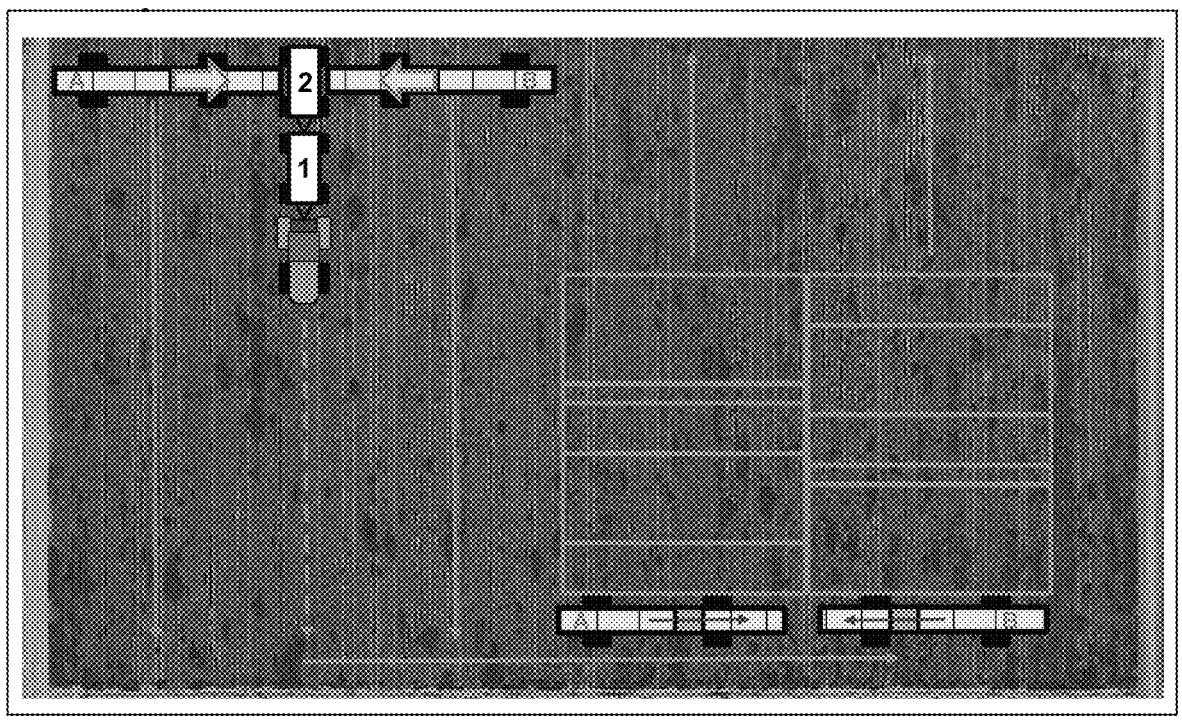
FIG. 6D depicts an example visualization of the generation of a yield map using the methods and systems described herein.
Figure 6E:
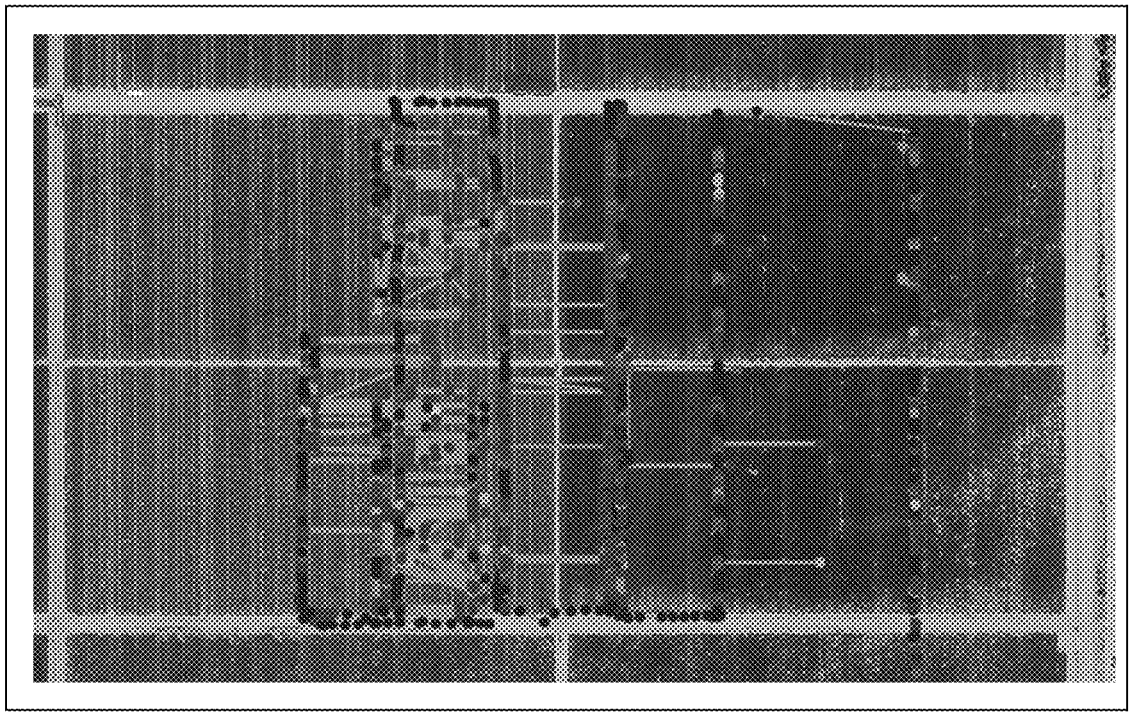
FIG. 6E depicts an example of a yield map in which differences in product yield are identified in picking areas, and the picking area yields are overlaid on a digital image of the field that also shows the tracking, across the field, of an agricultural apparatus carrying the video camera that captured imagery of the instances of horticultural product used to produce the yield data, as they were harvested.

At block 616, using peak/valley data 614, a sub-field generation process determines, for each time interval defined by starting and ending timestamp data in which the product count is greater than zero, the geographic location data associated with that same time interval. The geographic location correlated with each such time interval indicates the geographic of the harvester within the field during that time interval. Sub-field generation process 616 outputs the correlated geographic location, time interval, and product data as sub-field data 618. Sub-field data 618 is indicative of product yield for a sub-field area; that is, a particular picking area, of the harvested field. Examples of sub-field areas and correlations of product counts to sub-field areas are shown in FIG. 6D and FIG. 6E, described below. Sub-field data 618 may be used to generate graphical yield maps such as the yield maps shown in FIG. 7A and FIG. 7B, described below. Alternatively or in addition, sub-field data 618 may be output in a form of electronic communication capable of being used by a computing device to control an agricultural operation.

For instance, portions of sub-field data 618 may be incorporated into one or more scripts that may be provided to an application controller 114. The application controller 114, which is communicatively coupled to computer system 130 via the network(s) 109, is programmed or configured to receive the sub-field data 618 via the one or more scripts. The one or more scripts containing sub-field data 618 are used to control an operating parameter of a device, vehicle or implement, such as computing device 104, apparatus 117 or device 111, from the computer system 130. An adjustment of an operating parameter determined using the sub-field data determined disclosed technologies and communicated to a device, vehicle or implement by one or more scripts causes the device, vehicle or implement to, for example, change direction, increase or decrease speed, increase or decrease application rate of a nutrient, or change the boundaries of a management zone, while traversing a field. Operating parameter adjustments corresponding to particular values of sub-field data may be pre-determined and stored in, for example, a look-up table or database.

A controller area network (CAN) bus interface may be used to enable communications from the computer system 130 to the computer 116 via the network(s) 109 or from the computer 116 to the apparatus 117. The network(s) 109 may be used to enable communications from the imaging system 115 to the computer system 130, from the computer system 130 to the imaging system 115, from the computer system 130 to the computing device 104 or the computer 116, from the computing device 104 or the computer 116 to the computer system 130.

FIG. 6B, FIG. 6C, and FIG. 6D illustrate aspects of a programmed process by which the example computer system generates a yield map, which can be used by other apparatus with which the system may interoperate.

FIG. 6B is an example of a plot of product count data over timestamp data, where the time stamp data is indicated in one-hour increments. FIG. 6C is an expanded view of the portion of plot 620 that is within box 622. Each of time interval rectangles 632, 634, 646, 638, 640, 642 indicates an area of the plot in which the product count was greater than zero. For each rectangle, a start timestamp and an end timestamp are determined, where the start and end timestamps define the width of the rectangle and thus a particular time interval in which the product count was greater than zero. The product counts within a particular time interval are aggregated to produce a total product count for the time interval. For example, the total product count for time interval 632 would be approximately 130. For each time interval identified on the plot 630, the geographic location of the harvester at the start and end timestamps is determined, and that geographic information is used to map the product count data to the corresponding picking area locations within the field.

FIG. 6D illustrates an example of a belt-assisted harvesting operation within a field. A harvester apparatus travels through the field perpendicular to the rows of product to be harvested. The harvester apparatus includes harvester bins [1], [2] and conveyor belts [A], [B]. Horticultural product is picked from the rows and placed on the conveyor belts. The conveyor belts transport the harvested product to the harvester bins. Each conveyor belt is equipped with a video camera apparatus that captures digital video imagery of an instance of product as the product passes through the camera's field of view on its way to the harvester bin. The resulting video imagery is input to the computer system 130 and analyzed as described herein.

The rectangular areas shown in the right hand portion of FIG. 6D and overlaid on the field imagery illustrate examples of picking areas within the field. Each rectangular area represents a different picking area. The width of a picking area, perpendicular to the direction of travel of the harvester, is defined by the swath width of the harvester; for example, the length of the conveyor belt. The length of the picking area, parallel to the direction of travel of the harvester, is defined by a time interval. For example, a bottom corner of the rectangle corresponds to a first timestamp at which time the harvester was located at a first particular geographic location, and a top corner of the rectangle corresponds to a second timestamp at which time the harvester was located at a second particular geographic location. Thus, the magnitude of the length indicates how far the harvester traveled within the time interval between the first and second timestamps. As a result, the timestamp data can be used to correlate particular product count data with particular picking areas of the field. FIG. 6D illustrates an example of a field with product count data mapped to picking area locations within the field.

4.4. Yield Map Examples

FIG. 6E, FIG. 7A and FIG. 7B illustrate examples of yield maps that may be produced by embodiments of the disclosed technologies, which can be used by other apparatus with which the system may interoperate. FIG. 6E is an example of a yield map in which differences in product yield are indicated by color coding of picking areas, and the picking area yields are overlaid on a digital image of the field that also shows the tracking, across the field, of an agricultural apparatus carrying the video camera that captured imagery of the instances of horticultural product used to produce the yield data, as they were harvested. FIG. 7A is an example of a yield map in which differences in raw product yield, a simple count of aggregate product count per picking area, are indicated by color coding of picking areas, and the picking area yields are plotted by longitude and latitude. FIG. 7B is similar to FIG. 7A except that each color-coded block represents a yield per acre rather than a raw yield count. Yield maps such as FIG. 7A and FIG. 7B can be used to, for example, identify sub-field picking areas that have higher than average or lower than average yields. Alternatively or in addition, yield maps can be output in a form of electronic communication capable of being used by a remote device to control an agricultural operation.

For instance, portions of one or more yield maps may be incorporated into one or more scripts that may be provided to an application controller 114. The application controller 114, which is communicatively coupled to computer system 130 via the network(s) 109, is programmed or configured to receive the one or more yield maps via the one or more scripts. The one or more scripts containing one or more yield maps are used to control an operating parameter of a device, vehicle or implement, such as computing device 104, apparatus 117 or device 111, from the computer system 130. A portion of a yield map determined using the disclosed technologies and communicated to a device, vehicle, or implement by a script causes the device, vehicle or implement to, for example, change direction, increase or decrease speed, increase or decrease application rate of a nutrient, or change the boundaries of a management zone, while traversing a field. Operating parameter adjustments corresponding to particular values of yield map data may be pre-determined and stored in, for example, a look-up table or database.

A controller area network (CAN) bus interface may be used to enable communications from the computer system 130 to the computer 116 via the network(s) 109 or from the computer 116 to the apparatus 117. The network(s) 109 may be used to enable communications from the imaging system 115 to the computer system 130, from the computer system 130 to the imaging system 115, from the computer system 130 to the computing device 104 or the computer 116, from the computing device 104 or the computer 116 to the computer system 130.

5. ADDITIONAL EXAMPLES

Illustrative examples of the technologies disclosed herein are provided below. An embodiment of the technologies may include any of the examples or a combination of the described below.

In an example 1, a computer-implemented method includes: inputting, to a machine-learned model that has been trained to recognize a horticultural product in digital imagery, digital video data including frames that represent a view of the horticultural product in belt-assisted transit from a picking area of a field to a harvester bin; outputting, by the machine-learned model, annotated video data, the annotated video data including digital annotation data indicative of individual instances of the horticultural product detected in the frames by the machine-learned model, digital geographic location data produced by a sensor that sensed geographic locations at which the frames were captured, and digital timestamp data indicative of timestamps associated with the frames; using the annotated video data, computing quantitative data indicative of particular counts of the individual instances of the horticultural product associated with particular timestamp data; using the digital timestamp data, mapping the quantitative data to the digital geographic location data to produce a digital yield map; outputting the digital yield map in a form of electronic communication capable of being used by a remote device to control an agricultural operation.

An example 2 includes the subject matter of example 1, further including generating time series data with the digital timestamp data as an independent variable and the quantitative data as a dependent variable. An example 3 includes the subject matter of example 2, further including, using the time series data, determining a time interval in which a count of individual instances of the horticultural product is greater than zero and mapping the time interval to a geographic location of a particular picking area of the field. An example 4 includes the subject matter of example 3, the yield map being indicative of a count of the individual instances of the horticultural product associated with the particular picking area of the field. An example 5 includes the subject matter of any of examples 1-4, further including, using the digital annotation data, computing size data indicative of sizes of the individual instances of the horticultural product. An example 6 includes the subject matter of example 5, further including, using the timestamp data, mapping the size data to the digital geographic location data and including the size data in the digital yield map. An example 7 includes at least one non-transitory storage medium storing instructions which, when executed by at least one processor, cause performance of operations recited in any of claims 1-6. An example 8 includes a computer system including at least one processor and at least one non-transitory storage media storing instructions which, when executed by the at least one processor cause the computer system to be capable of performance of operations recited in any of claims 1-6. An example 9 includes an electronic device including means for performance of operations recited in any of claims 1-6. An example 10 includes a method, system, or apparatus, as shown and described in any one or more paragraphs of the disclosure and/or any one or more of the drawing figures.

6. BENEFITS, EXTENSIONS AND ALTERNATIVES

The techniques of this disclosure offer numerous practical benefits and technological improvements. For example, yield monitoring of horticultural products is improved by the particular configurations of processing components that enable the mapping of product yield information to the corresponding picking area locations within a field. The use of a computer vision-based model enables yield data to be captured at or near the picking area location. The particular manner in which timestamp data is used can further improve the accuracy of the yield to picking area mappings. These and other aspects of the disclosed technologies enable aerial imagery to be used for precision horticultural applications.

Additionally, yield predictions generated by embodiments can be used to improve the positioning and operation of horticultural machines at planting time and/or at harvest time. Graphical displays, of field data, such as field maps that may be displayed on a cab computer, also can be improved based on predictions that are generated by embodiments. In this manner, the disclosure integrates the processes that are described into practical applications including but not limited to improving machine operations associated with horticultural planting and harvesting. Furthermore, the disclosure is not limited to horticultural applications but rather provides clear improvements to multiple technologies including horticulture, agriculture, agriscience, crop management and field management, as well as graphical user interfaces and graphical information displays.

All processes disclosed herein are intended to be implemented using programmed computers to accomplish the benefits and improvements that are described above via specific processes that are disclosed. The disclosure is directed to these processes, not to concepts. Nothing in the disclosure is intended or should be interpreted as disclosing or claiming an abstract idea, product of nature, law of nature or natural phenomenon. Nothing in the disclosure is intended or should be interpreted as disclosing or claiming only mathematical concepts, certain methods of organizing human activity or mental processes, and any interpretation of the claims to cover any of the foregoing cannot be reasonable in view of the disclosure and this paragraph.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving, from an imaging apparatus coupled to a harvesting implement, digital video data comprising frames that represent a view of a horticultural product on a moving conveyor belt of the harvesting implement during a harvesting operation;
receiving, from one or more location sensors coupled to the harvesting implement, digital geographic location data produced by the one or more location sensors, wherein the digital geographic location data identifies geographic locations of the harvesting implement when the digital video data was captured;
inputting, to a machine-learned model that has been trained to recognize the horticultural product in digital imagery, the digital video data;
outputting annotated video data, the annotated video data comprising digital annotation data identifying individual instances of the horticultural product detected in frames of the digital video data using the machine-learned model, the digital geographic location data, and digital timestamp data comprising timestamps associated with the frames;
using the annotated video data, computing quantitative data identifying particular counts of the individual instances of the horticultural product associated with particular timestamp data;
using the digital timestamp data, mapping the quantitative data to the digital geographic location data to produce a digital yield map; and
causing display of the digital yield map on a field manager computing device.

2. The method of claim 1, further comprising generating time series data with the digital timestamp data as an independent variable and the quantitative data as a dependent variable.

3. The method of claim 2, further comprising, using the time series data, determining a time interval in which a count of individual instances of the horticultural product is greater than zero and mapping the time interval to a geographic location of a particular picking area of a field.

4. The method of claim 1, wherein computing the quantitative data comprises:
separating the annotated video data into vertical slices;
incrementing a count of the horticultural product each time a detected instance of the horticultural product is identified as having not been counted in a vertical slice of the vertical slices; and
further annotating the annotated video data to indicate that the detected instance of the horticultural product has been counted.

5. The method of claim 4, wherein separating the annotated video data into vertical slices comprises generating a plurality of vertical slice grids, each of which comprising a plurality of vertical slices, and wherein computing the quantitative data comprises only incrementing the count of the horticultural product if the detected instance of the horticultural product is identified as having not been counted according to each of the vertical slice grids.

6. The method of claim 5, wherein the digital yield map comprises a count of the individual instances of the horticultural product associated with a particular picking area of a field.

7. The method of claim 1, further comprising, using the digital annotation data, computing size data identifying sizes of the individual instances of the horticultural product.

8. The method of claim 7, further comprising, using the digital timestamp data, mapping the size data to the digital geographic location data and including the size data in the digital yield map.

9. The method of claim 1, further comprising:
using the digital yield map, generating one or more scripts for an application controller and sending the one or more scripts to the application controller, wherein the application controller executes the one or more scripts to cause the application controller to control an operating parameter of an agricultural implement to cause the agricultural implement to execute an agricultural or horticultural operation on an agricultural field.

10. A system comprising:
a harvesting implement comprising a conveyor belt through which a harvested horticultural product moves from a particular picking area of a field to a harvesting bin;
an imaging apparatus coupled to the harvest implement configured to capture digital video data comprising frames that represent a view of the harvested horticultural product as the harvested horticultural product moves through the conveyor belt during a harvesting operation;
one or more location sensors coupled to the harvesting implement configured to produce digital geographic location data identifying a geographic location of the harvesting implement when the digital video data was captured;
one or more processors; and
a memory storing instructions which, when executed by the one or more processors, cause performance of:
inputting, to a machine-learned model trained to recognize a horticultural product in digital imagery, the captured digital video data;
outputting, using the machine-learned model, annotated video data, the annotated video data comprising digital annotation data identifying individual instances of the horticultural product detected in frames of the digital video data by the machine-learned model, the digital geographic location data, and digital timestamp data comprising timestamps associated with the frames;
using the annotated video data, computing quantitative data comprising particular counts of the individual instances of the horticultural product associated with particular timestamp data;
using the digital timestamp data, mapping the quantitative data to the digital geographic location data to produce a digital yield map; and
causing display of the digital yield map on a field manager computing device.

11. The system of claim 10, further comprising a vehicle coupled to the harvesting implement and configured to move while hauling the harvesting implement at a plurality of times through a plurality of locations in the field.

12. The system of claim 10, wherein the instructions, when executed by the one or more processors further cause performance of generating time series data with the digital timestamp data as an independent variable and the quantitative data as a dependent variable.

13. The system of claim 12, wherein the instructions, when executed by the one or more processors further cause performance of using the time series data, determining a time interval in which a count of individual instances of the horticultural product is greater than zero and mapping the time interval to a geographic location of a particular picking area of the field.

14. The system of claim 10, wherein the digital yield map comprises a count of the individual instances of the horticultural product associated with the particular picking area of the field.

15. The system of claim 10, wherein computing the quantitative data comprises:
separating the annotated video data into vertical slices;
incrementing a count of the horticultural product each time a detected instance of the horticultural product is identified as having not been counted in a vertical slice of the vertical slices; and
further annotating the annotated video data to indicate that the detected instance of the horticultural product has been counted.

16. The system of claim 15, wherein separating the annotated video data into vertical slices comprises generating a plurality of vertical slice grids, each of which comprising a plurality of vertical slices, and wherein computing the quantitative data comprises only incrementing the count of the horticultural product if the detected instance of the horticultural product is identified as having not been counted according to each of the vertical slice grids.

17. The system of claim 10, wherein the instructions, when executed by the one or more processors further cause performance of using the digital annotation data, computing size data comprising sizes of the individual instances of the horticultural product.

18. The system of claim 17, wherein the instructions, when executed by the one or more processors further cause performance of using the digital timestamp data, mapping the size data to the digital geographic location data and including the size data in the digital yield map.

19. The system of claim 10, wherein the instructions, when executed by the one or more processors further cause performance of: using the digital yield map, generating one or more scripts for an application controller and sending the one or more scripts to the application controller, wherein the application controller executes the one or more scripts to cause the application controller to control an operating parameter of an agricultural implement to cause the agricultural implement to execute an agricultural or horticultural operation on an agricultural field.

\* \* \* \* \*